US012683045B2

(12) United States Patent
Akiyama et al.

(10) Patent No.: US 12,683,045 B2
(45) Date of Patent: Jul. 14, 2026

(54) MULTILAYER VARISTOR

(71) Applicant: Panasonic Intellectual Property Management Co., Ltd., Osaka (JP)

(72) Inventors: Yuto Akiyama, Hokkaido (JP); Masashi Takamura, Hokkaido (JP); Ken Yanai, Hokkaido (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 454 days.

(21) Appl. No.: 18/264,034

(22) PCT Filed: Feb. 18, 2022

(86) PCT No.: PCT/JP2022/006782
§ 371 (c)(1),
(2) Date: Aug. 2, 2023

(87) PCT Pub. No.: WO2022/181504
PCT Pub. Date: Sep. 1, 2022

(65) Prior Publication Data
US 2024/0105365 A1 Mar. 28, 2024

(30) Foreign Application Priority Data
Feb. 24, 2021 (JP) ................................ 2021-027021

(51) Int. Cl.
*H01C 1/142* (2006.01)
*H01C 7/10* (2006.01)
*H01C 7/18* (2006.01)

(52) U.S. Cl.
CPC ............... *H01C 1/142* (2013.01); *H01C 7/10* (2013.01); *H01C 7/18* (2013.01)

(58) Field of Classification Search
CPC ............ H01C 1/142; H01C 7/10; H01C 7/18
See application file for complete search history.

(56) References Cited

U.S. PATENT DOCUMENTS 5,159,300 A * 10/1992 Nakamura ........... H03H 1/0007
338/21
12,183,491 B2 * 12/2024 Takamura .............. H01C 7/112
(Continued)

FOREIGN PATENT DOCUMENTS

JP H06-275464 A 9/1994
JP H07-235406 A 9/1995
(Continued)

OTHER PUBLICATIONS

International Search Report dated Apr. 5, 2022 issued in International Patent Application No. PCT/JP2022/006782, with English translation.

*Primary Examiner* — Kyung S Lee
(74) *Attorney, Agent, or Firm* — Rimon P.C.

(57) ABSTRACT

An object of the present disclosure is to provide a multilayer varistor with the ability to reduce the chances of causing crosstalk between external terminals. Inside a sintered body having the shape of a rectangular parallelepiped, of which the longitudinal axis is aligned with a first direction, a first facing portion and a second facing portion are provided to interpose a third facing portion between themselves. At least one of a first side surface or a second side surface is provided with a first external electrode connected to the first facing portion, a second external electrode connected to the second facing portion, and a third external electrode and a fourth external electrode connected to the third facing portion. In the first direction, the first external electrode and the second external electrode are interposed between the third external electrode and the fourth external electrode.

20 Claims, 20 Drawing Sheets

(56) References Cited

U.S. PATENT DOCUMENTS

| | | | | |
|---|---|---|---|---|
| 12,224,090 | B2 * | 2/2025 | Takamura .............. | H01C 1/148 |
| 2004/0233606 | A1 | 11/2004 | Inoue et al. | |
| 2007/0091532 | A1 * | 4/2007 | Yamauchi ................ | H01C 7/18<br>361/118 |
| 2011/0205725 | A1 * | 8/2011 | Demcko .................. | H01C 1/14<br>361/821 |
| 2023/0079197 | A1 * | 3/2023 | Takamura .............. | H01C 7/105<br>338/20 |

FOREIGN PATENT DOCUMENTS

| | | | |
|---|---|---|---|
| JP | 2874695 | B1 | 3/1999 |
| JP | 2001-307910 | A | 11/2001 |
| JP | 2004-311877 | A | 11/2004 |

* cited by examiner

MULTILAYER VARISTOR

CROSS-REFERENCE OF RELATED APPLICATIONS

This application is the U.S. National Phase under 35 U.S.C. § 371 of International Patent Application No. PCT/JP2022/006782, filed on Feb. 18, 2022, which in turn claims the benefit of Japanese Patent Application No. 2021-027021, filed on Feb. 24, 2021, the entire disclosures of which Applications are incorporated by reference herein.

TECHNICAL FIELD

The present invention relates to a multilayer varistor for use in various types of electronic devices.

BACKGROUND ART

Recently, as various types of consumer electronic appliances and onboard electronic devices have been further downsized, varistors, forming part of those appliances and devices, have been increasingly required to have an even smaller size. In addition, the higher the operating frequency of a circuit including a varistor is, the more likely the performance of the varistor (in terms of the varistor's surge absorption capability) will be affected by its capacitance. That is why there has been an increasing demand for a varistor that not only ensures a predetermined varistor voltage but also has smaller capacitance with significantly reduced variation. Meanwhile, a structure including a pair of varistors in a single element has been proposed in the known art to reduce the difference in capacitance between the two varistors used as the pair. Such a structure is disclosed by, for example, Patent Document 1, which is one of the documents related to the subject-matter of the present application.

In a known multilayer varistor, a pair of external electrodes, each of which is connected to a signal line, are arranged at both ends thereof, and an external terminal is interposed as a common terminal between the external electrodes and grounded. However, if the varistor is disposed on a balanced line and connected to a pair of signal lines that form the balanced line, then the signal lines forming the balanced line need to be bent, thus increasing the chances of losing the balance. Conversely, arranging a pair of external terminals, connected to balanced terminals, respectively, at the middle allows signal lines to be easily coupled to each other inside the multilayer structure, thus increasing the chances of causing crosstalk.

CITATION LIST

Patent Literature

Patent Literature 1: JP H07-235406 A

SUMMARY OF INVENTION

It is therefore an object of the present disclosure to reduce the chances of causing crosstalk.

A multilayer varistor according to an aspect of the present disclosure includes a sintered body, a first internal electrode, a second internal electrode, a third internal electrode, a first external electrode, a second external electrode, a third external electrode, and a fourth external electrode. The sintered body has: a first end surface and a second end surface facing each other in a first direction; a first side surface and a second side surface facing each other in a second direction; and a first principal surface and a second principal surface facing each other in a third direction. The sintered body is formed in a shape of a rectangular parallelepiped, of which a longitudinal axis is aligned with the first direction. The sintered body has a multilayer structure in which a plurality of layers are stacked one on top of another in the third direction. The first internal electrode is provided on a first stacking plane inside the sintered body. The second internal electrode is provided on a second stacking plane inside the sintered body. The second stacking plane is different from the first stacking plane. The third internal electrode is provided on a third stacking plane inside the sintered body. The third stacking plane is interposed between the first stacking plane and the second stacking plane. The first external electrode is provided for at least one of the first side surface or the second side surface and electrically connected to the first internal electrode. The second external electrode is provided for at least one of the first side surface or the second side surface and electrically connected to the second internal electrode. The third external electrode and the fourth external electrode are both provided for at least one of the first side surface or the second side surface and electrically connected to the third internal electrode. The third internal electrode has a first overlapping region that overlaps in the third direction with at least a part of the first internal electrode and a second overlapping region that overlaps in the third direction with at least a part of the second internal electrode. The first external electrode and the second external electrode are interposed in the first direction between the third external electrode and the fourth external electrode.

A multilayer varistor according to another aspect of the present disclosure includes a sintered body, a first internal electrode, a second internal electrode, a third internal electrode, a first external electrode, a second external electrode, a third external electrode, and a fourth external electrode. The sintered body has a first end surface and a second end surface facing each other in a first direction, a first side surface and a second side surface facing each other in a second direction, and a first principal surface and a second principal surface facing each other in a third direction. The sintered body is formed in a shape of a rectangular parallelepiped, of which a longitudinal axis is aligned with the first direction. The sintered body has a multilayer structure in which a plurality of layers are stacked one on top of another in the third direction. The first internal electrode is provided on a first stacking plane inside the sintered body. The second internal electrode is provided on a second stacking plane inside the sintered body. The second stacking plane is different from the first stacking plane. The third internal electrode is provided on a third stacking plane inside the sintered body. The third stacking plane is interposed between the first stacking plane and the second stacking plane. The first external electrode is provided for at least one of the first side surface or the second side surface and electrically connected to the first internal electrode. The second external electrode is provided for at least one of the first side surface or the second side surface and electrically connected to the second internal electrode. The third external electrode is provided for the first end surface and electrically connected to the third internal electrode. The fourth external electrode is provided for the second end surface and electrically connected to the third internal electrode. The third internal electrode has a first overlapping region that overlaps in the third direction with at least a part of the first internal electrode and a second overlapping region that overlaps in the third direction with at least a part of the second internal electrode. The first external electrode and the second external electrode are interposed in the first direction between the third external electrode and the fourth external electrode.

DESCRIPTION OF EMBODIMENTS

A multilayer varistor according to an exemplary embodiment of the present disclosure will be described with reference to the accompanying drawings.

First Embodiment

Figure 1:
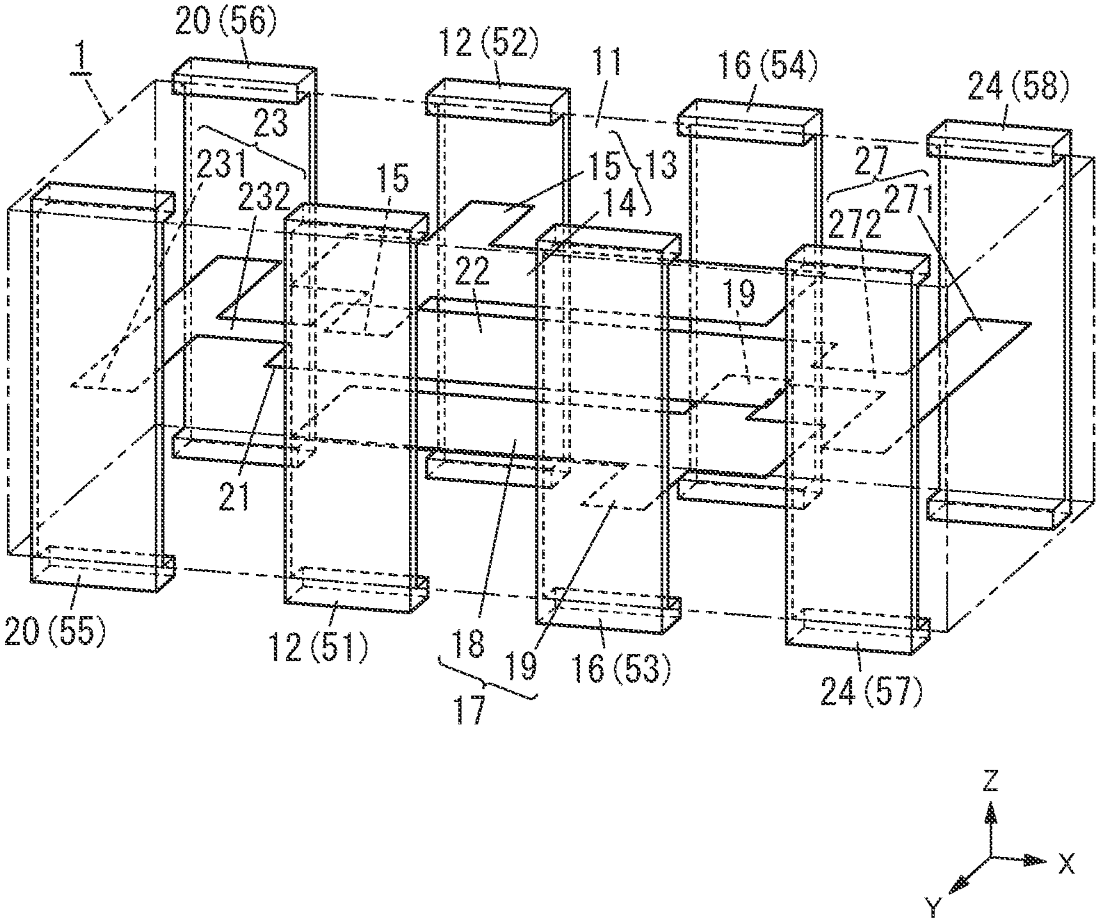
FIG. 1 is a see-through perspective view of a multilayer varistor according to a first embodiment of the present disclosure.
Figure 2:
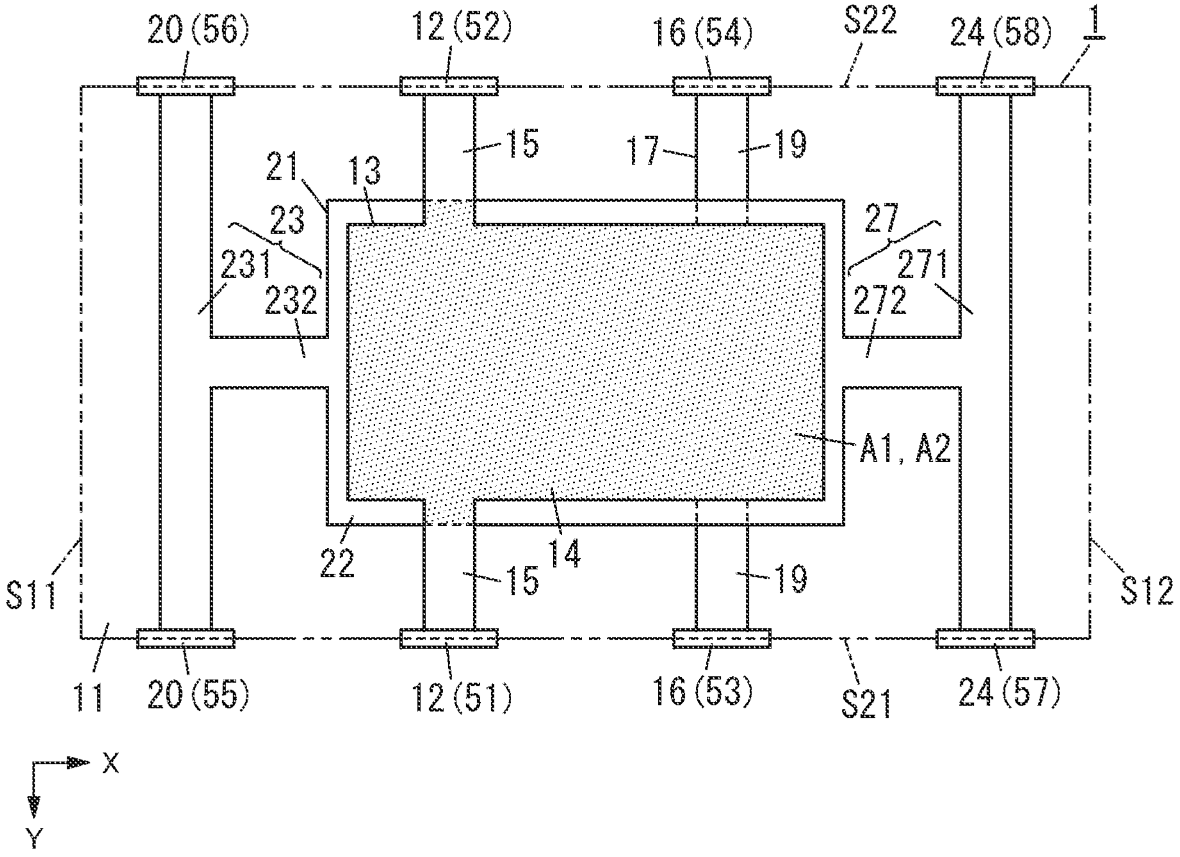
FIG. 2 is a see-through top view of the multilayer varistor.
Figure 3:
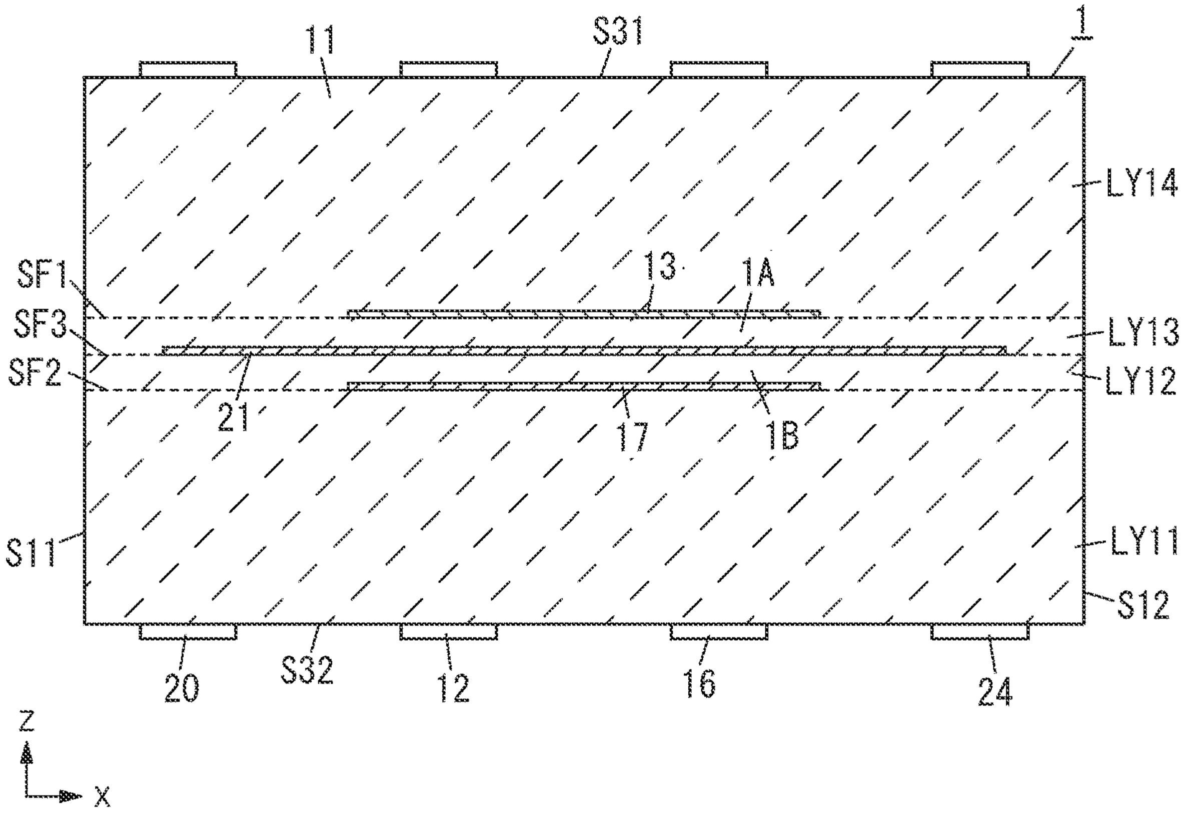
FIG. 3 is a cross-sectional view of the multilayer varistor.
Figure 4:
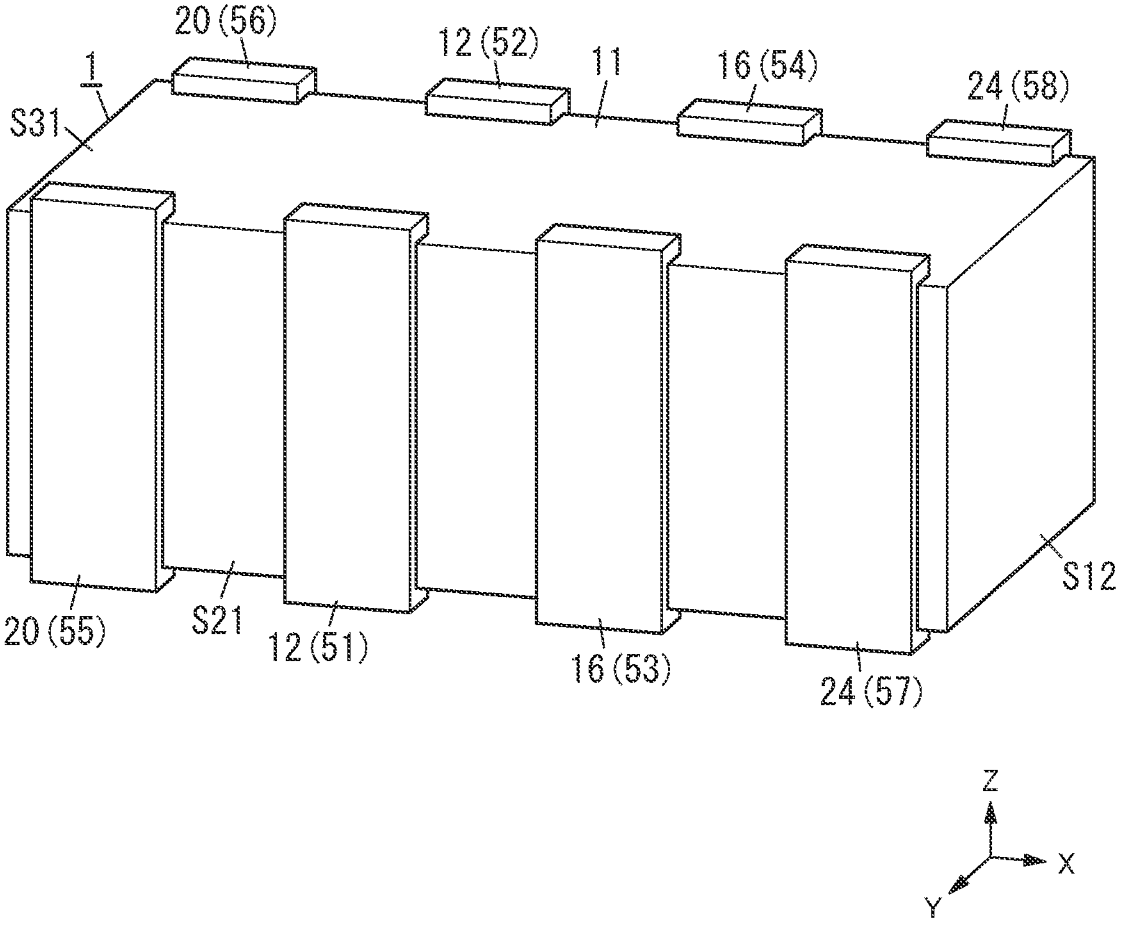
FIG. 4 is a perspective view illustrating the appearance of the multilayer varistor.

FIG. 1 is a see-through perspective view of a multilayer varistor 1 according to an exemplary embodiment. FIG. 2 is a see-through top view of the multilayer varistor 1. FIG. 3 is a cross-sectional view of the multilayer varistor 1. FIG. 4 is a perspective view illustrating the appearance of the multilayer varistor 1. The multilayer varistor 1 includes a sintered body 11, a first internal electrode 13, a second internal electrode 17, a third internal electrode 21, a first external electrode 12, a second external electrode 16, a third external electrode 20, and a fourth external electrode 24. The sintered body 11 of the multilayer varistor 1 except the external electrodes has the shape of a rectangular parallelepiped having a length of 1.6 mm, a width of 0.8 mm, and a height of 0.6 mm Note that these dimensions of the sintered body 11 are only examples and may be changed as appropriate. Also, although the sintered body 11 is illustrated as a rectangular parallelepiped in FIG. 4 and other drawings illustrating its appearance, the corner portions of the sintered body 11 may be chamfered and rounded as appropriate.

In the following description, the X-axis direction parallel to the longitudinal axis of the sintered body 11 is herein defined as a rightward/leftward direction, the Y-axis direction is herein defined as a forward/backward direction (depth direction), and the Z-axis direction is herein defined as an upward/downward direction as shown in FIG. 1. Furthermore, the positive side of the X-axis direction is herein defined as the right side, the positive side of the Y-axis direction is herein defined as the front side, and the positive side of the Z-axis direction is herein defined as the upside. Note that these directions are only examples and should not be construed as limiting the direction in which the multilayer varistor 1 is supposed to be used. Note that arrows indicating these directions are shown on the drawings for illustrative purposes only and are insubstantial ones.

As shown in FIGS. 2 and 3, the sintered body 11 has a first end surface S11 and a second end surface S12 facing each other in a first direction; a first side surface S21 and a second side surface S22 facing each other in a second direction; and a first principal surface S31 and a second principal surface S32 facing each other in a third direction. The sintered body 11 has a multilayer structure in which a plurality of layers LY11-LY14 (refer to FIG. 3) are stacked one on top of another in the third direction and is formed in the shape of a rectangular parallelepiped, of which the longitudinal axis is aligned with the first direction.

The sintered body 11 is made of a semiconductor ceramic component with a nonlinear resistance characteristic. This sintered body 11 contains ZnO as a main component thereof and either $Bi_2O_3$, $Co_2O_3$, $MnO_2$, $Sb_2O_3$, or any other suitable compound or $Pr_6O_{11}$, $Co_2O_3$, $CaCO_3$, $Cr_2O_3$ or any other suitable compound as a sub-component thereof. The sintered body 11 more preferably contains ZnO as a main component thereof and either at least one compound selected from the group consisting of $Bi_2O_3$, $Co_2O_3$, $MnO_2$, and $Sb_2O_3$ or at least one compound selected from the group consisting of $Pr_6O_{11}$, $Co_2O_3$, $CaCO_3$, and $Cr_2O_3$ as sub-components thereof. The sintered body 11 may be formed by causing ZnO to be sintered and causing other sub-components to deposit on the grain boundary thereof. In this sintered body 11, the internal electrodes are formed between the multiple layers stacked. In addition, a grain boundary barrier formed between the ZnO particles allows the sintered body 11 to express the nonlinear resistance characteristic. The sintered body 11 may be formed by, for example, stacking four layers LY11-LY14 (refer to FIG. 3), each containing ZnO as a main component thereof, one on top of another, and then sintering the stack of those layers.

On each longer side surface of the sintered body 11, provided are the first external electrode 12 and the second external electrode 16. More specifically, at the middle of each of the longer side surfaces (namely, the first side surface S21 and second side surface S22) of the sintered body 11, the first external electrode 12 and the second external electrode 16 are arranged side by side along the longer side surface (i.e., in the first direction). In addition, each longer side surface of the sintered body 11 is also provided with the third external electrode 20 and the fourth external electrode 24, which are located closer to the shorter sides of the sintered body 11 than the first external electrode 12 and the second external electrode 16 are. That is to say, the first external electrode 12 and the second external electrode 16 are interposed in the first direction between the third external electrode 20 and the fourth external electrode 24. More specifically, on each of the longer side surfaces (namely, the first side surface S21 and the second side surface S22) of the sintered body 11, the third external electrode 20 is interposed between the first external electrode 12 and the first end surface S11, while the fourth external electrode 24 is interposed between the second external electrode 16 and the second end surface S12. That is to say, the third external electrode 20, the first external electrode 12, the second external electrode 16, and the fourth external electrode 24 are arranged side by side in this order in the first direction.

The first to fourth external electrodes 12, 16, 20, 24 may be made of, for example, a metal such as silver, copper, platinum, or an alloy thereof. The first to fourth external electrodes 12, 16, 20, 24 may be formed by, for example, transferring, using a roller, conductive paste onto the surface of the sintered body 11. Each of the first to fourth external electrodes 12, 16, 20, 24 may include a primary electrode made of, for example, silver, copper, platinum, or an alloy thereof and a secondary electrode formed as a plating layer of nickel or tin, for example, on the surface of the primary electrode.

The first external electrode 12 is provided for at least one of the first side surface S21 or the second side surface S22 and is electrically connected to the first internal electrode 13 provided inside the sintered body 11. In this embodiment, the first external electrode 12 is provided for each of the first side surface S21 and the second side surface S22. That is to say, the first external electrode 12 is made up of a first electrode 51 provided on the first side surface S21 and a second electrode 52 provided on the second side surface S22. The first electrode 51 and the second electrode 52 are electrically connected to each other via the first internal electrode 13.

The second external electrode 16 is provided for at least one of the first side surface S21 or the second side surface S22 and is electrically connected to the second internal electrode 17 provided inside the sintered body 11. In this embodiment, the second external electrode 16 is provided for each of the first side surface S21 and the second side surface S22. That is to say, the second external electrode 16 is made up of a third electrode 53 provided on the first side surface S21 and a fourth electrode 54 provided on the second side surface S22. The third electrode 53 and the fourth electrode 54 are electrically connected to each other via the second internal electrode 17.

Inside the sintered body 11, provided is the third internal electrode 21 that is electrically connected to the third external electrode 20 and the fourth external electrode 24. In other words, the third external electrode 20 and the fourth external electrode 24 are provided for at least one of the first side surface S21 or the second side surface S22 and are electrically connected to the third internal electrode 21 provided inside the sintered body 11.

In this embodiment, the third external electrode 20 is provided for each of the first side surface S21 and the second side surface S22. That is to say, the third external electrode 20 is made up of a fifth electrode 55 provided on the first side surface S21 and a sixth electrode 56 provided on the second side surface S22. The fifth electrode 55 and the sixth electrode 56 are electrically connected to each other via the third internal electrode 21.

In this embodiment, the fourth external electrode 24 is provided for each of the first side surface S21 and the second side surface S22. That is to say, the fourth external electrode 24 is made up of a seventh electrode 57 provided on the first side surface S21 and an eighth electrode 58 provided on the second side surface S22. The seventh electrode 57 and eighth electrode 58 are electrically connected to each other via the third internal electrode 21.

In this embodiment, the sintered body 11 is formed by stacking, for example, four layers LY11-LY14 one on top of another in the third direction (refer to FIG. 3). The first internal electrode 13 may be provided by printing, for example, on the upper surface of the third lowermost layer LY13 (hereinafter referred to as a "first stacking plane SF1") out of the four layers LY11-LY14. The second internal electrode 17 may be provided by printing, for example, on the upper surface of the lowermost layer LY11 (hereinafter referred to as a "second stacking plane SF2"). The third internal electrode 21 may be provided by printing, for example, on the upper surface of the second lowermost layer LY12 (hereinafter referred to as a "third stacking plane SF3"). In other words, the first internal electrode 13 is provided on the first stacking plane SF1 inside the sintered body 11. The second internal electrode 17 is provided on the second stacking plane SF2, which is different from the first stacking plane SF1, inside the sintered body 11. The third internal electrode 21 is provided on the third stacking plane SF3, which is interposed between the first stacking plane SF1 and the second stacking plane SF2, inside the sintered body 11. That is to say, in the third direction (upward/downward direction), the third internal electrode 21 is interposed between the first internal electrode 13 and the second internal electrode 17. The first to third internal electrodes 13, 17, 21 may be made of, for example, a metal such as silver, copper, gold, platinum, or an alloy thereof.

The first internal electrode 13 includes a first facing portion 14 and at least one first extended portion 15 having a narrower width than the first facing portion 14. Specifically, the first extended portion 15 has a narrower width as measured in the first direction (i.e., rightward/leftward direction) than the first facing portion 14. The first extended portion 15 protrudes in the second direction (i.e., forward/backward direction) from the first facing portion 14. In this embodiment, two first extended portions 15 protrude forward and backward, respectively, from the first facing portion 14. One of the two first extended portions 15 is electrically connected to the first external electrode 12 (first electrode 51) provided on the first side surface S21. The other of the two first extended portions 15 is electrically connected to the first external electrode 12 (second electrode 52) provided on the second side surface S22.

The second internal electrode 17 includes a second facing portion 18 and at least one second extended portion 19 having a narrower width than the second facing portion 18. Specifically, the second extended portion 19 has a narrower width as measured in the first direction (i.e., rightward/leftward direction) than the second facing portion 18. The second extended portion 19 protrudes in the second direction (i.e., forward/backward direction) from the second facing portion 18. In this embodiment, two second extended portions 19 protrude forward and backward, respectively, from the second facing portion 18. One of the two second extended portions 19 is electrically connected to the second external electrode 16 (third electrode 53) provided on the first side surface S21. The other of the two second extended portions 19 is electrically connected to the second external electrode 16 (fourth electrode 54) provided on the second side surface S22.

The third internal electrode 21 includes a third facing portion 22, a third extended portion 23, and a fourth extended portion 27. The third extended portion 23 includes a first linking portion 231 and a first protruding portion 232. The first linking portion 231 links together the two third external electrodes 20 (namely, the fifth electrode 55 and the sixth electrode 56). The first protruding portion 232 has a narrower width as measured in the second direction than the third facing portion 22. The first protruding portion 232 protrudes in the first direction from the third facing portion 22 to be connected to the first linking portion 231. The fourth extended portion 27 includes a second linking portion 271 and a second protruding portion 272. The second linking portion 271 links together the two fourth external electrodes 24 (namely, the seventh electrode 57 and eighth electrode 58). The second protruding portion 272 has a narrower width as measured in the second direction than the third facing portion 22. The second protruding portion 272 protrudes in the first direction from the third facing portion 22 to be connected to the second linking portion 271. In other words, the third internal electrode 21 includes the third facing portion 22, the third extended portion 23 connected to the third external electrodes 20 and having a narrower width than the third facing portion 22, and the fourth extended portion 27 connected to the fourth external electrodes 24 and having a narrower width than the third facing portion 22.

In this embodiment, when measured in the second direction, the width of the first protruding portion 232 protruding in the first direction from the third facing portion 22 is preferably equal to or less than 90% of the width of the third facing portion 22. Likewise, when measured in the second direction, the width of the second protruding portion 272 protruding in the first direction from the third facing portion 22 is preferably equal to or less than 90% of the width of the third facing portion 22. Making the width of each of the first protruding portion 232 and the second protruding portion 272 as measured in the second direction equal to or less than 90% of the width of the third facing portion 22 reduces the chances of causing crosstalk.

The first external electrodes 12 are connected to the first facing portion 14 via the first extended portions 15. The second external electrodes 16 are connected to the second facing portion 18 via the second extended portions 19. The third external electrodes 20 are connected to the third facing portion 22 via the third extended portion 23. The fourth external electrodes 24 are connected to the third facing portion 22 via the fourth extended portion 27.

The third internal electrode 21 is arranged to be sandwiched, in the stacking direction of the sintered body 11, between the first internal electrode 13 and the second internal electrode 17 and the third facing portion 22 is arranged to face not only the first facing portion 14 but also the second facing portion 18, thus forming a varistor region. In other words, the multilayer varistor 1 includes two varistors (hereinafter referred to as a "first varistor 1A" and a "second varistor 1B," respectively). The first varistor 1A is formed between the first external electrodes 12, the third external electrodes 20, and the fourth external electrodes 24 (i.e., between the first internal electrode 13 and the third internal electrode 21). The second varistor 1B is formed between the second external electrodes 16 and the fourth external electrodes 24 (i.e., between the second internal electrode 17 and the third internal electrode 21).

The third facing portion 22 may have the shape of a rectangle with dimensions of 0.46 mm×0.2 mm, for example. The first facing portion 14 and the second facing portion 18 may each have the shape of a rectangle with dimensions of 0.4 mm×0.14 mm, for example. Also, the third facing portion 22 and the first facing portion 14 face each other with a gap of 0.035 mm, for example, left between themselves in the stacking direction of the sintered body 11. In the same way, the third facing portion 22 and the second facing portion 18 face each other with a gap of 0.035 mm, for example, left between themselves in the stacking direction of the sintered body 11. Note that these dimensions are only an example and may be changed as appropriate.

In this case, respective centers of the first facing portion 14, the second facing portion 18, and the third facing portion 22 agree with each other when viewed in the stacking direction. In other words, the third internal electrode 21 has a first overlapping region A1, which overlaps in the third direction with at least a part of the first internal electrode 13, and a second overlapping region A2, which overlaps in the third direction with at least a part of the second internal electrode 17. The first overlapping region A1 covers at least a region (i.e., the region indicated by dotted hatch in FIG. 2), facing the first facing portion 14 of the first internal electrode 13, of the third internal electrode 21. The second overlapping region A2 covers at least a region, facing the second facing portion 18 of the second internal electrode 17, of the third internal electrode 21. The first facing portion 14 and the second facing portion 18 are aligned with each other in the third direction. Thus, in the third internal electrode 21, the first overlapping region A1 and the second overlapping region A2 overlap with each other at least partially. Specifically, the first overlapping region A1 and the second overlapping region A2 overlap with each other in the region where the first facing portion 14 and the second facing portion 18 overlap with each other.

In addition, when viewed in the stacking direction, the third facing portion 22 overreaches the first facing portion 14 and the second facing portion 18 by, for example, 0.03 mm, to cover the entire periphery of the first facing portion 14 and the second facing portion 18. This reduces the chances of producing stray capacitance between the first facing portion 14 and the second facing portion 18 and thereby reducing crosstalk. The degree of overreach, to which the third facing portion 22 overreaches the first facing portion 14 and the second facing portion 18, does not have to be 0.03 mm but may be changed as appropriate.

Also, the third facing portion 22 is arranged to cover the entire periphery of the first facing portion 14 and the second facing portion 18. Therefore, when measured in the first direction, the length of the third facing portion 22 is greater than any one of the length of the first facing portion 14 or the length of the second facing portion 18. This makes it easier, even if the third facing portion 22 has relatively shifted to a certain degree in the first direction with respect to the first facing portion 14 and the second facing portion 18, for the third facing portion 22 to face the first facing portion 14 and the second facing portion 18 in their entirety, thus reducing a variation in capacitance.

In addition, when measured in the second direction, the length of the third facing portion 22 is greater than any one of the length of the first facing portion 14 or the length of the second facing portion 18. This makes it easier, even if the third facing portion 22 has relatively shifted to a certain degree in the second direction with respect to the first facing portion 14 and the second facing portion 18, for the third facing portion 22 to face the first facing portion 14 and the second facing portion 18 in their entirety, thus reducing a variation in capacitance.

In this embodiment, the length of the third facing portion 22 is greater than any of the respective lengths of the first facing portion 14 and the second facing portion 18, in each of the first and second directions. However, this is only an example and should not be construed as limiting. Alternatively, the length of the third facing portion 22 may be greater than any of the respective lengths of the first facing portion 14 and the second facing portion 18, in only one of the first and second directions.

Furthermore, the area of the third facing portion 22 is larger than any one of the area of the first facing portion 14 or the area of the second facing portion 18. This reduces not only crosstalk but also an increase in difference in capacitance between the first varistor 1A and the second varistor 1B due to a manufacturing error, for example.

The first extended portions 15, each having a width of 0.1 mm, for example, are extended from the first facing portion 14 to be connected to the first external electrodes 12 on both of the longer side surfaces (namely, the first side surface S21 and the second side surface S22). In the same way, the second extended portions 19, each having a width of 0.1 mm, for example, are extended from the second facing portion 18 to be connected to the second external electrodes 16 on both of the longer side surfaces (namely, the first side surface S21 and the second side surface S22). The third extended portion 23 having a width of 0.1 mm, for example, is extended from the third facing portion 22 to be connected to the third external electrodes 20. In addition, the fourth extended portion 27 having a width of 0.1 mm, for example, is extended from the third facing portion 22 to be connected to the fourth external electrodes 24. In this manner, each facing portion is connected to the external electrodes via an extended portion having a narrower width than the facing portion. This reduces the stray capacitance produced between the first external electrodes 12 and the second external electrodes 16, thus minimizing the effect on crosstalk.

The first extended portions 15 and the second extended portions 19 each preferably have a width, for example, equal to or greater than 0.08 mm and equal to or less than 90% of the width of the first facing portion 14 and the second facing portion 18. In other words, when measured in the first direction, the width of the first extended portions 15 is preferably equal to or less than 90% of the width of the first facing portion 14. Likewise, when measured in the first direction, the width of the second extended portions 19 is preferably equal to or less than 90% of the width of the second facing portion 18. Setting the width of the first extended portions 15 and the second extended portions 19 at a value less than 0.08 mm would cause the first extended portions 15 and the second extended portions 19 to have an irregular shape and also often cause instability in connection of the internal electrodes to the external electrodes. Conversely, making the width of the first extended portions 15 greater than 90% of the width of the first facing portion 14 or making the width of the second extended portion 19 greater than 90% of the width of the second facing portion 18 would increase the stray capacitance that affects crosstalk, which is not beneficial.

Also, in top view, the degree to which the third facing portion 22 overreaches the outer periphery of the first facing portion 14 and the second facing portion 18 in the first direction (hereinafter simply referred to as a "degree of overreach") is preferably equal to or greater than 7.5% and equal to or less than 15% of the length of the longer sides of each of the first facing portion 14 and the second facing portion 18. As used herein, the "degree of overreach" of the third facing portion 22 in the first direction refers to the sum of the degree to which the third facing portion 22 overreaches the outer periphery of the first facing portion 14 and the second facing portion 18 to the right and the degree to which the third facing portion 22 overreaches the outer periphery of the first facing portion 14 and the second facing portion 18 to the left. Specifically, when measured in the first direction, the length of the third facing portion 22 is equal to or greater than 107.5% and equal to or less than 115% of respective lengths of the first facing portion 14 and the second facing portion 18. If the degree of overreach of the third facing portion 22 in the first direction were less than 7.5% with respect to the dimension of the first facing portion 14 and the second facing portion 18, then crosstalk would increase significantly. On the other hand, if the degree of overreach of the third facing portion 22 in the first direction were greater than 15% with respect to the dimension of the first facing portion 14 and the second facing portion 18, then the manufacturing error would not be reduced but the difference in capacitance between the two varistors would rather increase. The degree of overreach of the third facing portion 22 in the first direction is more preferably equal to or greater than 9% and equal to or less than 13.5% of the length of the first facing portion 14 or the second facing portion 18. This further reduces crosstalk and also reduces the manufacturing error.

Furthermore, in top view, the degree to which the third facing portion 22 overreaches the outer periphery of the first facing portion 14 and the second facing portion 18 in the second direction (hereinafter simply referred to as a "degree of overreach") is preferably equal to or greater than 7.5% and equal to or less than 15% of the length of the shorter sides of each of the first facing portion 14 and the second facing portion 18. As used herein, the "degree of overreach" of the third facing portion 22 in the second direction refers to the sum of the degree to which the third facing portion 22 overreaches the outer periphery of the first facing portion 14 and the second facing portion 18 toward the front and the degree to which the third facing portion 22 overreaches the outer periphery of the first facing portion 14 and the second facing portion 18 toward the rear. In other words, when measured in the second direction, the length of the third facing portion 22 is preferably equal to or greater than 107.5% and equal to or less than 115% of respective lengths of the first facing portion 14 and the second facing portion 18. If the degree of overreach of the third facing portion 22 in the second direction were less than 7.5% with respect to the dimension of the first facing portion 14 and the second facing portion 18, then crosstalk would increase significantly. On the other hand, if the degree of overreach of the third facing portion 22 in the second direction were greater than 15% with respect to the dimension of the first facing portion 14 and the second facing portion 18, then the manufacturing error would not be reduced but the difference in capacitance between the two varistors would rather increase. The degree of overreach of the third facing portion 22 in the second direction is more preferably equal to or greater than 9% and equal to or less than 13.5% of the length of the first facing portion 14 or the second facing portion 18. This further reduces crosstalk and also reduces the manufacturing error.

Arranging the multilayer varistor 1 having such a configuration on a balanced line, consisting of a pair of signal lines extending parallel to each other, with the first external electrodes 12 and the second external electrodes 16 connected to the signal lines and with the third external electrodes 20 and the fourth external electrodes 24 grounded enables connecting the multilayer varistor 1 to the balanced line without bending its paths. Superposing static electricity on the signal lines that form the balanced line and applying a voltage higher than a predetermined threshold voltage to the multilayer varistor 1 (i.e., either the first varistor 1A or the second varistor 1B) would cause a significant decrease in the electrical resistance of the multilayer varistor 1 to allow a current to flow through the multilayer varistor 1. This allows a circuit provided with the multilayer varistor 1 to be protected.

Also, in the multilayer varistor 1 according to this embodiment, the first to fourth external electrodes 12, 16, 20, 24 are formed by transferring, using a roller, conductive paste onto the surface of the sintered body 11, for example. The first to fourth external electrodes 12, 16, 20, 24 provided on the first side surface S21 are extended from the first side surface S21 to partially cover the first principal surface S31 and the second principal surface S32. Likewise, the first to fourth external electrodes 12, 16, 20, 24 provided on the second side surface S22 are also extended from the second side surface S22 to partially cover the first principal surface S31 and the second principal surface S32.

Figure 5:
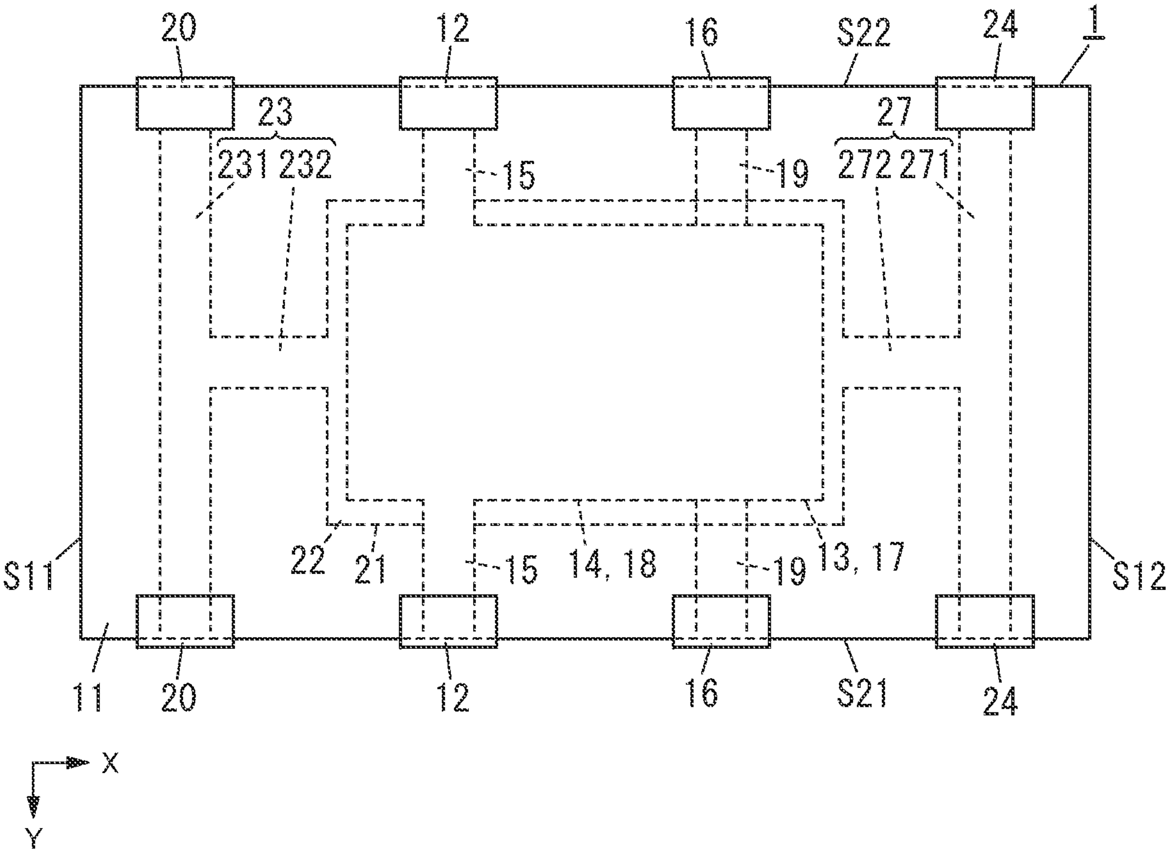
FIG. 5 is a plan view of the multilayer varistor.

In the multilayer varistor 1 according to this embodiment, the first facing portion 14 is arranged to avoid overlapping in the third direction with the second external electrodes 16 as shown in FIG. 5, thus reducing the chances of causing crosstalk between the first external electrodes 12 and the second external electrodes 16. Note that as far as the first facing portion 14 does not overlap in the third direction with the second external electrodes 16, the size of the first facing portion 14 as viewed in the third direction (i.e., in top view) is preferably increased as much as possible. This increases the amount of current that can flow through the multilayer varistor 1 (i.e., the first varistor 1A).

In addition, the second facing portion 18 is arranged to avoid overlapping in the third direction with the first external electrodes 12 as shown in FIG. 5, thus reducing the chances of causing crosstalk between the first external electrodes 12 and the second external electrodes 16. Note that as far as the second facing portion 18 does not overlap in the third direction with the first external electrodes 12, the size of the second facing portion 18 as viewed in the third direction (i.e., in top view) is preferably increased as much as possible. This increases the amount of current that can flow through the multilayer varistor 1 (i.e., the second varistor 1B).

The multilayer varistor 1 according to this embodiment includes the first varistor 1A and the second varistor 1B. Each of the first varistor 1A and the second varistor 1B preferably has a capacitance equal to or less than 200 pF. The difference in capacitance between the first varistor 1A and the second varistor 1B is preferably equal to or greater than −20% and equal to or less than +20% of the capacitance of the first varistor 1A. This reduces crosstalk when the multilayer varistor 1 is connected to a communication IC, for example, thus improving the quality of communication.

Variations of First Embodiment

Note that the embodiment described above is only an exemplary one of various embodiments of the present disclosure and should not be construed as limiting. Rather, the exemplary embodiment may be readily modified in various manners depending on a design choice or any other factor without departing from the scope of the present disclosure. Next, variations of the exemplary embodiment will be enumerated one after another. Note that the variations to be described below may be adopted in combination as appropriate. In addition, the variations to be described below may also be adopted in combination with a multilayer varistor 1 according to a second embodiment to be described later.

(First Variation)

Figure 6:
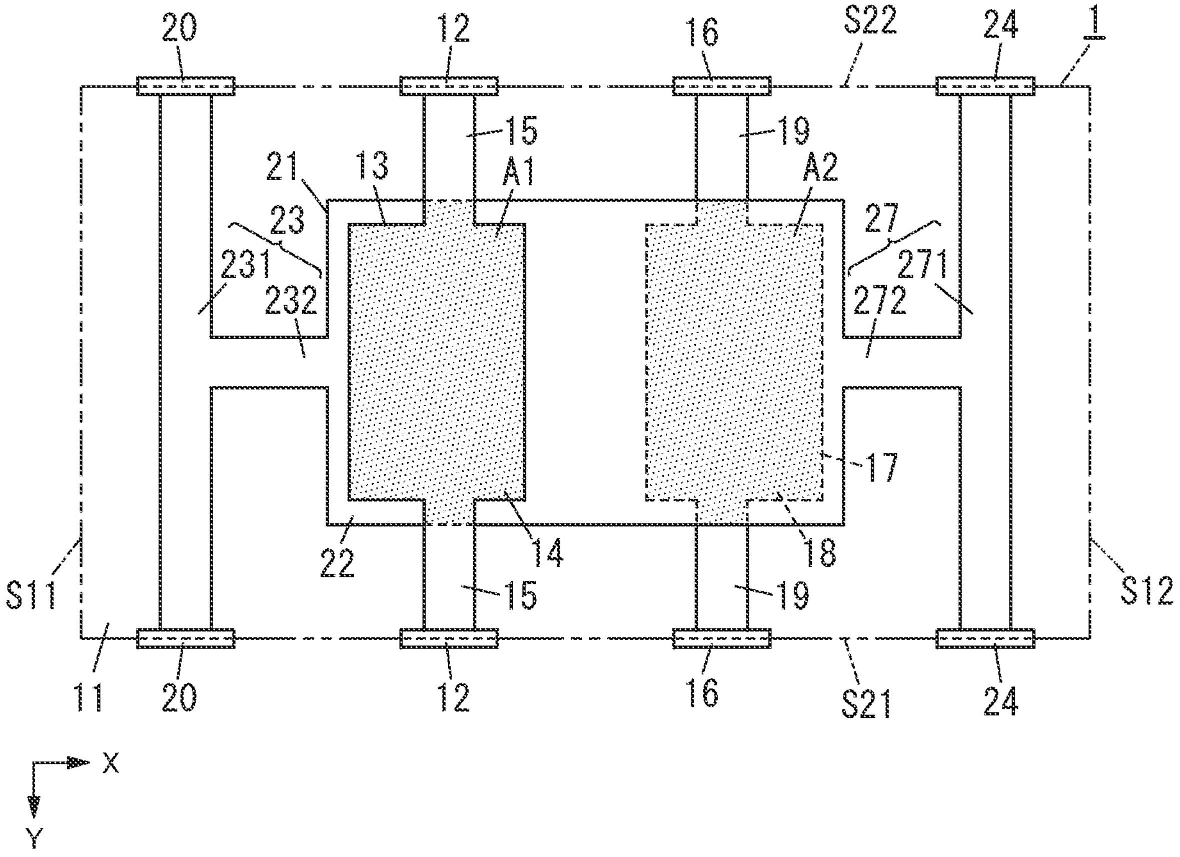
FIG. 6 is a see-through top view of a multilayer varistor according to a first variation of the present disclosure.
Figure 7:
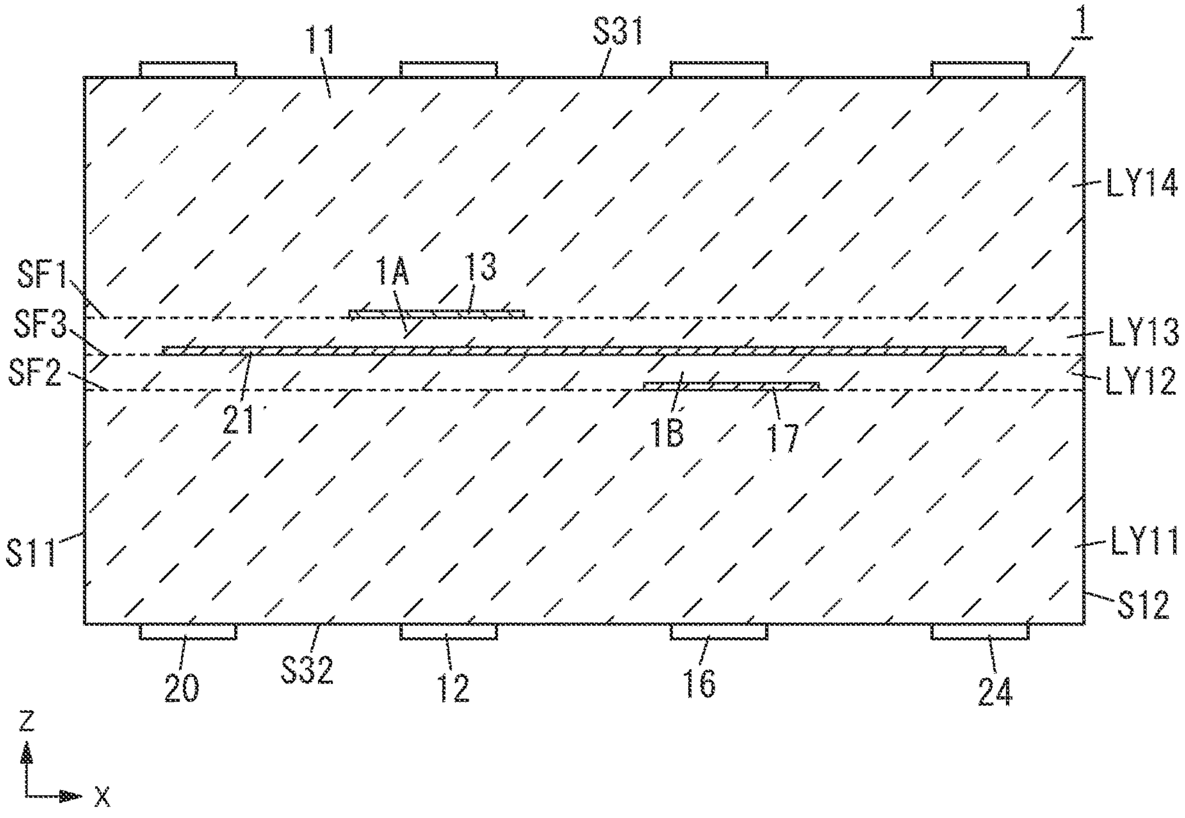
FIG. 7 is a cross-sectional view of the multilayer varistor according to the first variation.

FIG. 6 is a see-through top view of a multilayer varistor 1 according to a first variation of the first embodiment. FIG. 7 is a cross-sectional view of the multilayer varistor 1 according to the first variation.

The multilayer varistor 1 according to the first variation is configured such that the first facing portion 14 and the second facing portion 18 avoid overlapping with each other in top view. When measured in the first direction, the respective lengths of the first facing portion 14 and the second facing portion 18 are less than a half of the length of the third facing portion 22. When measured in the second direction, the length of the third facing portion 22 is equal to or greater than 107.5% and equal to or less than 115% of respective lengths of the first facing portion 14 and the second facing portion 18. In top view, the first facing portion 14 and the second facing portion 18 are arranged side by side in the first direction without overlapping with each other. This arrangement further reduces crosstalk. Except the first internal electrode 13 and the second internal electrode 17, the multilayer varistor 1 according to the first variation has the same configuration as the multilayer varistor 1 according to the exemplary embodiment described above. Thus, any constituent element of this first variation, having the same function as a counterpart of the first embodiment described above, will be designated by the same reference numeral as that counterpart's, and description thereof will be omitted herein.

In the multilayer varistor 1 according to the first variation shown in FIG. 6, the first external electrode 12 and the second external electrode 16 are provided for each of the first side surface S21 and the second side surface S22. The first extended portion 15 is extended toward both the first side surface S21 and the second side surface S22 to be electrically connected to the two first external electrodes 12, respectively. In the same way, the second extended portion 19 is also extended toward both the first side surface S21 and the second side surface S22 to be electrically connected to the two second external electrodes 16, respectively.

The third internal electrode 21 has a first overlapping region A1, which overlaps in the third direction with at least a part of the first internal electrode 13, and a second overlapping region A2, which overlaps in the third direction with at least a part of the second internal electrode 17. In FIG. 6, the first overlapping region A1 and the second overlapping region A2 are indicated by dotted hatch. In this variation, the first facing portion 14 and the second facing portion 18 are arranged to avoid overlapping with each other in the third direction. Thus, in the first overlapping region A1, the third internal electrode 21 overlaps with the first facing portion 14 without overlapping with the second facing portion 18. In the second overlapping region A2, the third internal electrode 21 overlaps with the second facing portion 18 without overlapping with the first facing portion 14. Thus, in the third internal electrode 21, the first overlapping region A1 and the second overlapping region A2 are separate from each other, i.e., provided as mutually different regions.

This arrangement may reduce the difference in capacitance between the two varistors (namely, the first varistor 1A and the second varistor 1B) even if the relative positions of the internal electrodes have changed. Alternatively, the first external electrodes 12 and the second external electrodes 16 may be provided for both the first side surface S21 and the second side surface S22, the first extended portion 15 may be provided for only the first side surface S21, the second extended portion 19 may be provided for only the second side surface S22, and these external electrodes and the extended portions may be electrically connected to each other. In that case, the first external electrode 12 provided on the second side surface S22 and the first facing portion 14 are not electrically connected to each other, and the second external electrode 16 provided on the first side surface S21 and the second facing portion 18 are not electrically connected to each other. According to this arrangement, soldering is carried out at the respective external electrodes, thus further reducing crosstalk while ensuring a sufficient degree of mountability.

Figure 8:
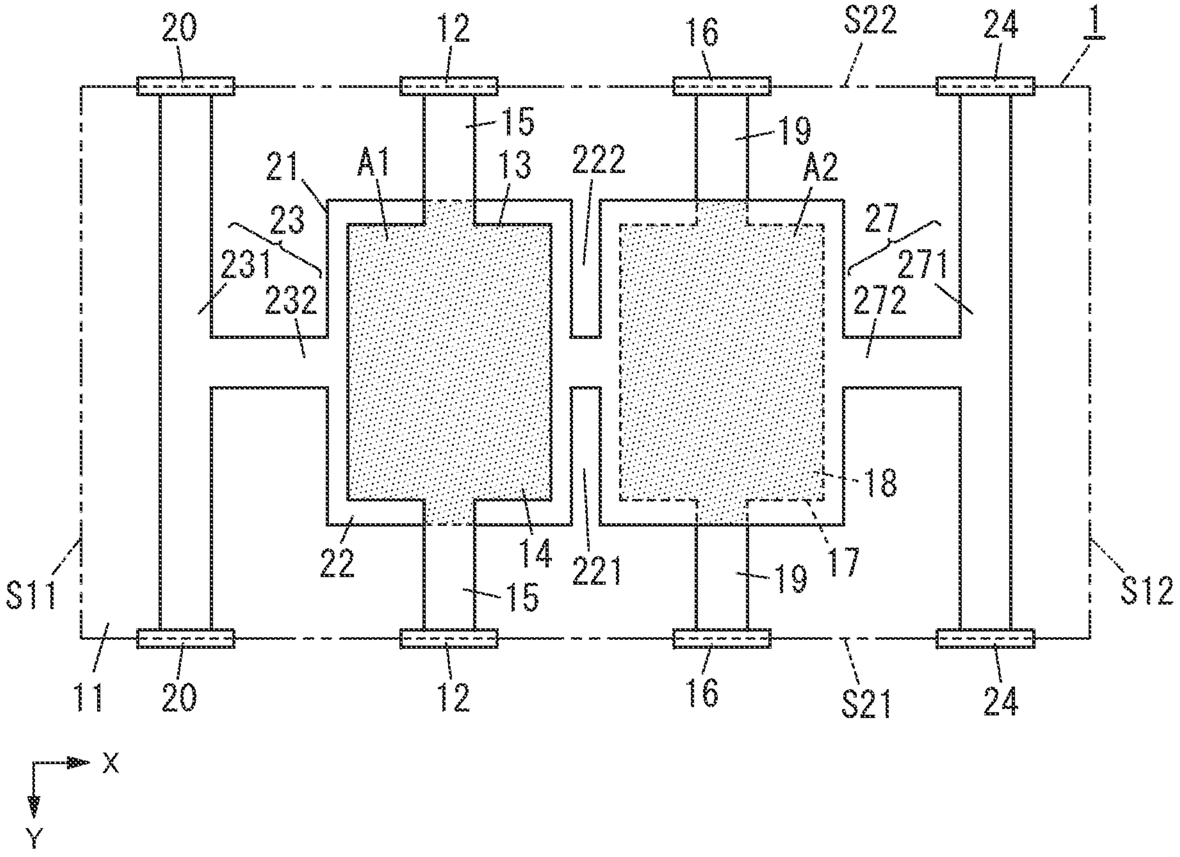
FIG. 8 is a see-through top view of a multilayer varistor according to a modified example of the first variation.

FIG. 8 is a see-through top view of a multilayer varistor 1 according to a modified example of the first variation. In the multilayer varistor 1 shown in FIG. 8, a part of the left half of the third facing portion 22 of the third internal electrode 21 serves as the first overlapping region A1 and a part of the right half of the third facing portion 22 serves as the second overlapping region A2. In addition, the third facing portion 22 is further provided with a groove 221, of which the opening faces forward, and another groove 222, of which the opening faces backward. These grooves 221 and 222 are provided between the first overlapping region A1 and the second overlapping region A2.

Providing these grooves 221, 222 for the third facing portion 22 may further reduce the capacitance produced between the first internal electrode 13 (first external electrode 12) and the second internal electrode 17 (second external electrode 16) and reduce crosstalk as well.

(Second Variation)

In the exemplary embodiment and the first variation thereof described above, the first to fourth external electrodes 12, 16, 20, 24 are provided for each of the first side surface S21 and the second side surface S22 of the sintered body 11. However, this is only an example and should not be construed as limiting. Alternatively, the first to fourth external electrodes 12, 16, 20, 24 may each be provided for at least one of the first side surface S21 or the second side surface S22.

Figure 9:
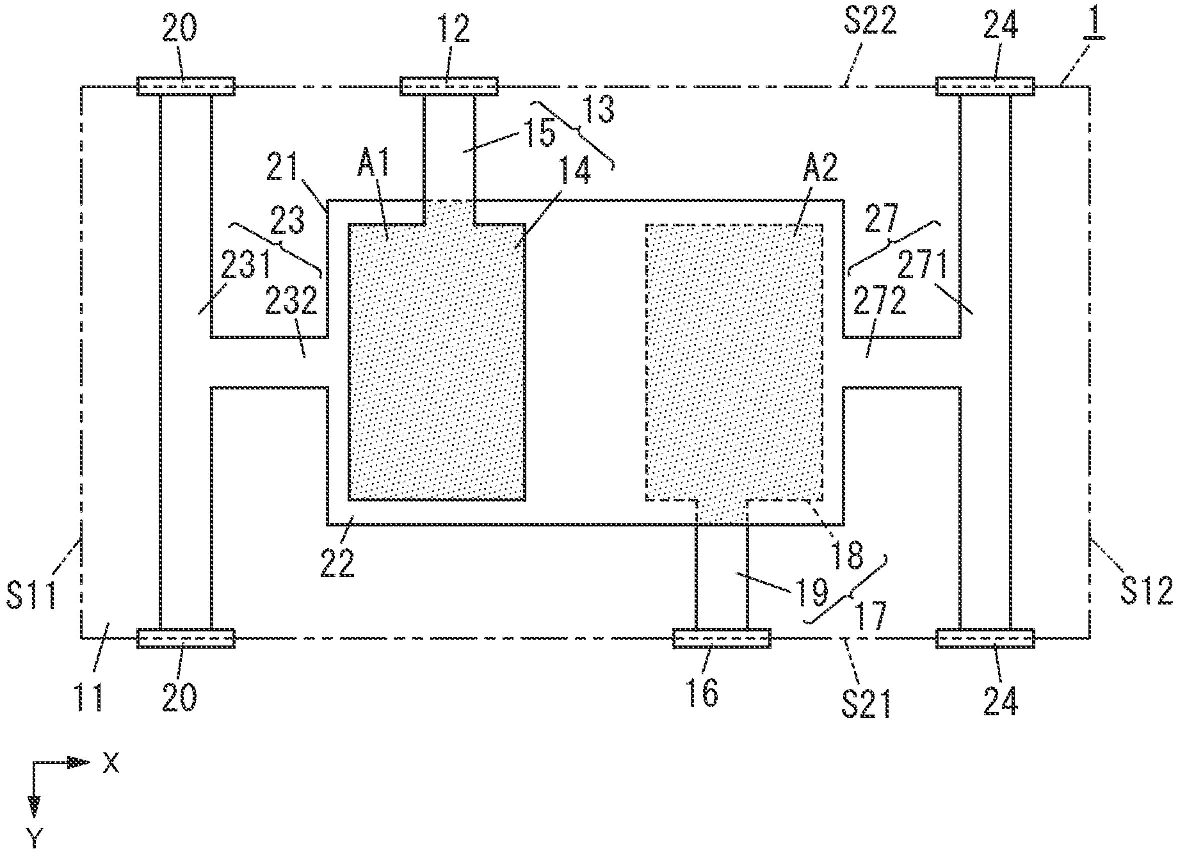
FIG. 9 is a see-through top view of a multilayer varistor according to a second variation.

FIG. 9 is a see-through top view of a multilayer varistor 1 according to a second variation of the first embodiment. In the multilayer varistor 1 according to the second variation, the first external electrode 12 is provided for only the second side surface S22 and the second external electrode 16 is provided for only the first side surface S21. In addition, the first extended portion 15 is provided for only the second side surface S22 and electrically connected to the first external electrode 12 provided on the second side surface S22. The second extended portion 19 is provided for only the first side surface S21 and electrically connected to the second external electrode 16 provided on the first side surface S21. Except the first external electrode 12, the second external electrode 16, the first internal electrode 13, and the second internal electrode 17, the multilayer varistor 1 according to the second variation has the same configuration as the multilayer varistor 1 that has already been described for the first variation with reference to FIGS. 6 and 7. Thus, any constituent element of this second variation, having the same function as a counterpart of the first variation described above, will be designated by the same reference numeral as that counterpart's, and description thereof will be omitted herein.

In the multilayer varistor 1 according to the second variation, the first external electrode 12 is provided for only the second side surface S22 and the second external electrode 16 is provided for only the first side surface S21. Thus, the multilayer varistor 1 according to this second variation increases the distance between the first extended portion 15 and the second extended portion 19, compared to the arrangement in which the first external electrode 12 and the second external electrode 16 are arranged side by side on each of the first side surface S21 and the second side surface S22. This causes almost no stray capacitance to be produced between the extended portions (namely, the first extended portion 15 and the second extended portion 19), thus further reducing crosstalk.

Figure 10:
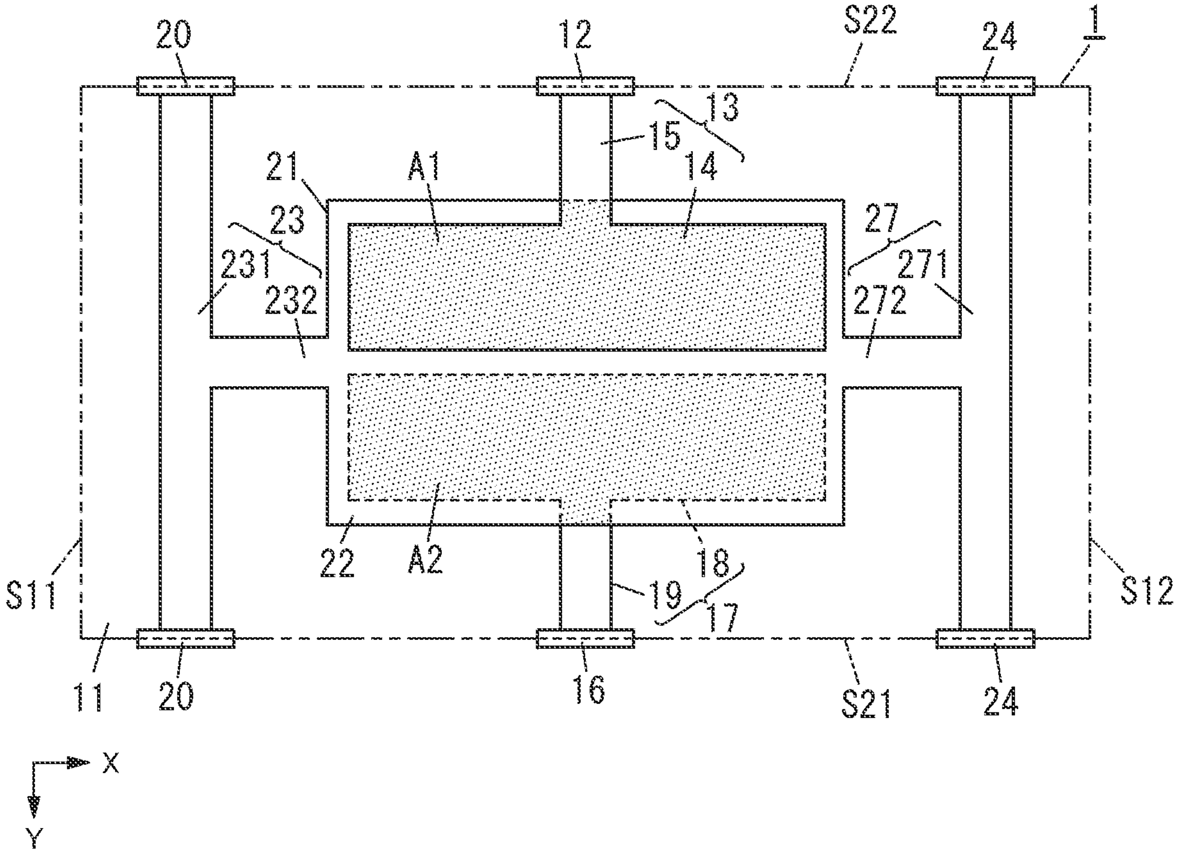
FIG. 10 is a see-through top view of a multilayer varistor according to a modified example of the second variation.

In the multilayer varistor 1 shown in FIG. 9, in top view, the first facing portion 14 and the second facing portion 18 are arranged side by side in the first direction without overlapping with each other. Alternatively, the first facing portion 14 and the second facing portion 18 may also be arranged in the second direction without overlapping with each other as shown in FIG. 10. Specifically, the first facing portion 14 and the second facing portion 18 may be arranged such that the first facing portion 14 is located backward of the second facing portion 18 and the second facing portion 18 is located forward of the first facing portion 14 in top view.

When measured in the second direction, the respective lengths of the first facing portion 14 and the second facing portion 18 are set at a dimension which is less than a half of the length of the third facing portion 22. When measured in the first direction, the length of the third facing portion 22 is equal to or greater than 107.5% and equal to or less than 115% of respective lengths of the first facing portion 14 and the second facing portion 18. In addition, in top view (i.e., when viewed in the third direction), the first facing portion 14 and the second facing portion 18 are arranged side by side in the second direction without overlapping with each other.

The first external electrode 12 is arranged on the second side surface S22 to be located at the middle between the third external electrode 20 and the fourth external electrode 24. The first facing portion 14 is electrically connected to the first external electrode 12 via the first extended portion 15 protruding backward from the first facing portion 14.

The second external electrode 16 is arranged on the first side surface S21 to be located at the middle between the third external electrode 20 and the fourth external electrode 24. The second facing portion 18 is electrically connected to the second external electrode 16 via the second extended portion 19 protruding forward from the second facing portion 18.

In the multilayer varistor shown in FIG. 10, the first external electrode 12 is arranged on the second side surface S22 to be located at the middle between the third external electrode 20 and the fourth external electrode 24. The second external electrode 16 is arranged on the first side surface S21 to be located at the middle between the third external electrode 20 and the fourth external electrode 24. This increases the distances from the first external electrode 12 to the third external electrode 20 and the fourth external electrode 24 and the distances from the second external electrode 16 to the third external electrode 20 and the fourth external electrode 24, compared to the multilayer varistor shown in FIG. 9. Consequently, this reduces the stray capacitance and thereby reduces the chances of causing crosstalk.

(Third Variation)

Figure 11:
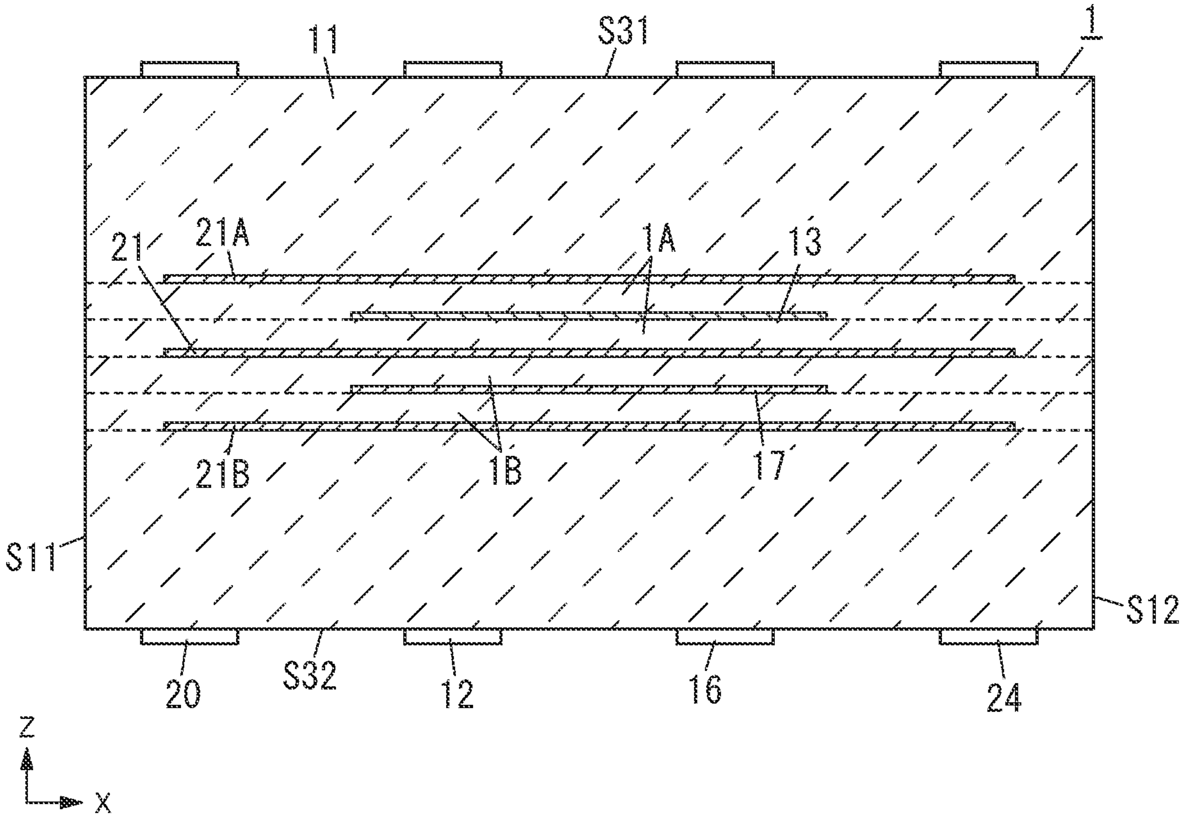
FIG. 11 is a cross-sectional view of a multilayer varistor according to a third variation.

FIG. 11 is a cross-sectional view of a multilayer varistor 1 according to a third variation of the first embodiment. The multilayer varistor 1 shown in FIG. 11 further includes third internal electrodes 21A, 21B, which is a difference from the exemplary embodiment described above. Except the third internal electrodes 21A, 21B, the multilayer varistor 1 shown in FIG. 11 has the same configuration as the first embodiment. Thus, any constituent element of this third variation, having the same function as a counterpart of the first embodiment described above, will be designated by the same reference numeral as that counterpart's, and description thereof will be omitted herein.

Each of the third internal electrodes 21A, 21B has the same shape, in top view, as the third internal electrode 21 and is arranged to overlap with the third internal electrode 21 in top view. In addition, each of these third internal electrodes 21A, 21B is electrically connected to the third external electrodes 20 and the fourth external electrodes 24. That is to say, each of these third internal electrodes 21A, 21B is electrically connected to the third internal electrode 21 via the third external electrodes 20 and the fourth external electrodes 24. In addition, inside the sintered body 11, the third internal electrode 21A is disposed over the third internal electrode 21 and the third internal electrode 21B is disposed under the third internal electrode 21. In this variation, the first varistor 1A is formed between the first internal electrode 13 and the third internal electrodes 21, 21A and the second varistor 1B is formed between the second internal electrode 17 and the third internal electrodes 21, 21B. This increases the value of a current that can flow through each of the first varistor 1A and the second varistor 1B.

Figure 12:
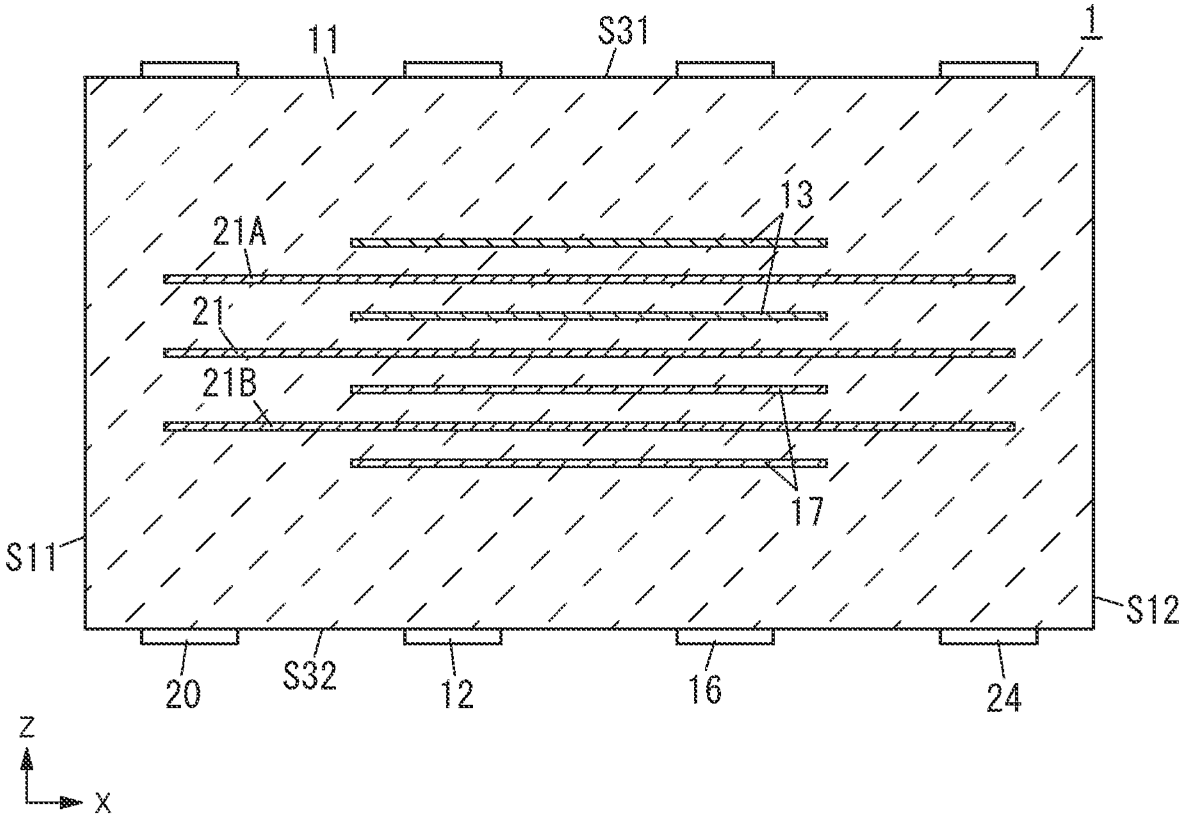
FIG. 12 is a cross-sectional view of a multilayer varistor according to a modified example of the third variation.

FIG. 12 is a cross-sectional view of a multilayer varistor 1 according to a modified example of the third variation. The multilayer varistor 1 shown in FIG. 12 includes a plurality of first internal electrodes 13 and a plurality of second internal electrodes 17. The third internal electrode 21A electrically connected to the third internal electrode 21 is interposed between the plurality of first internal electrodes 13. The third internal electrode 21B electrically connected to the third internal electrode 21 is interposed between the plurality of second internal electrodes 17. This multilayer varistor 1 according to this modified example of the third variation has the same configuration as the first embodiment described above, except that this multilayer varistor 1 includes the plurality of first internal electrodes 13 and the plurality of second internal electrodes 17 and the third internal electrodes 21A, 21B. Thus, any constituent element of this modified example of the third variation, having the same function as a counterpart of the first embodiment described above, will be designated by the same reference numeral as that counterpart's, and description thereof will be omitted herein.

The plurality of first internal electrodes 13 are formed to have the same shape in top view. The plurality of first internal electrodes 13 are arranged to overlap with each other in top view. The plurality of first internal electrodes 13 are electrically connected to the first external electrodes 12. The plurality of first internal electrodes 13 are electrically connected to each other via the first external electrodes 12.

The plurality of second internal electrodes 17 are formed to have the same shape in top view. The plurality of second internal electrodes 17 are arranged to overlap with each other in top view. The plurality of second internal electrodes 17 are electrically connected to the second external electrodes 16. The plurality of second internal electrodes 17 are electrically connected to each other via the second external electrodes 16.

The third internal electrode 21 is interposed between one of the plurality of first internal electrodes 13 and one of the plurality of second internal electrodes 17. Each of the third internal electrodes 21A, 21B has the same shape, in top view, as the third internal electrode 21 and is arranged to overlap with the third internal electrode 21 in top view. In addition, each of these third internal electrodes 21A, 21B is electrically connected to the third external electrodes 20 and the fourth external electrodes 24. That is to say, each of these third internal electrodes 21A, 21B is electrically connected to the third internal electrode 21 via the third external electrodes 20 and the fourth external electrodes 24. In addition, inside the sintered body 11, the third internal electrode 21A is interposed between the two first internal electrodes 13 and the third internal electrode 21B is interposed between the two second internal electrodes 17.

As can be seen, the multilayer varistor 1 shown in FIG. 12 includes the two first internal electrodes 13 and the two second internal electrodes 17. The first varistor 1A is formed between the two first internal electrodes 13 and the third internal electrodes 21, 21A. The second varistor 1B is formed between the two second internal electrodes 17 and the third internal electrodes 21, 21B. This increases the amount of current that may flow through each of the first varistor 1A and the second varistor 1B.

In the multilayer varistor 1 shown in FIG. 12, the number of the first internal electrodes 13 provided and the number of the second internal electrodes 17 provided are both two. Alternatively, the number of the first internal electrodes 13 provided and the number of the second internal electrodes 17 provided may also be three or more.

Optionally, in any of the exemplary embodiment and its variations, a plurality of third internal electrodes 21 may be arranged between the first internal electrode 13 and the second internal electrode 17. This further reduces the chances of causing crosstalk.

(Fourth Variation)

In the exemplary embodiment described above, the third facing portion 22 covers the entire periphery of the first facing portion 14 and the second facing portion 18. However, this is only an example and should not be construed as limiting. Rather, the third facing portion 22 only needs to be longer than any one of the first facing portion 14 or the second facing portion 18 in one of the first and second directions. Next, a multilayer varistor 1 according to a fourth variation will be described with reference to FIGS. 13 and 14. Except the dimensions of the first facing portion 14, the second facing portion 18, and the third facing portion 22, this fourth variation has the same configuration as the exemplary embodiment described above. Thus, any constituent element of this fourth variation, having the same function as a counterpart of the first embodiment described above, will be designated by the same reference numeral as that counterpart's, and description thereof will be omitted herein.

Figure 13:
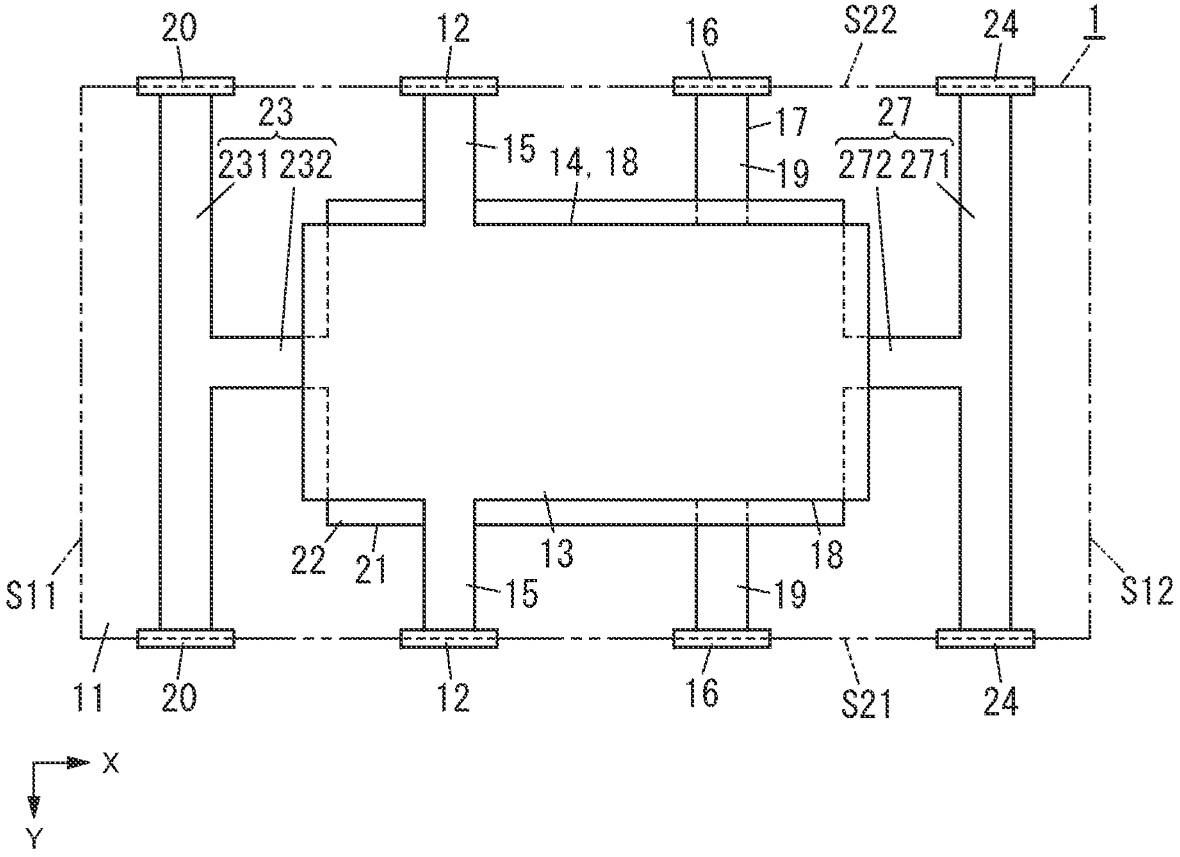
FIG. 13 is a see-through top view of a multilayer varistor according to a fourth variation.

FIG. 13 is a see-through top view of a multilayer varistor 1 according to the fourth variation. In the multilayer varistor 1 shown in FIG. 13, when measured in the first direction, the length of the third facing portion 22 is less than any one of the length of the first facing portion 14 or the length of the second facing portion 18. On the other hand, when measured in the second direction, the length of the third facing portion 22 is greater than any one of the length of the first facing portion 14 or the length of the second facing portion 18. This allows this multilayer varistor 1 to reduce the chances of causing crosstalk and also reduce the difference in capacitance between the first varistor 1A and the second varistor 1B due to a manufacturing error, compared to a situation where the third facing portion 22 is shorter in both of the first and second directions than any one of the first facing portion 14 or the second facing portion 18.

Figure 14:
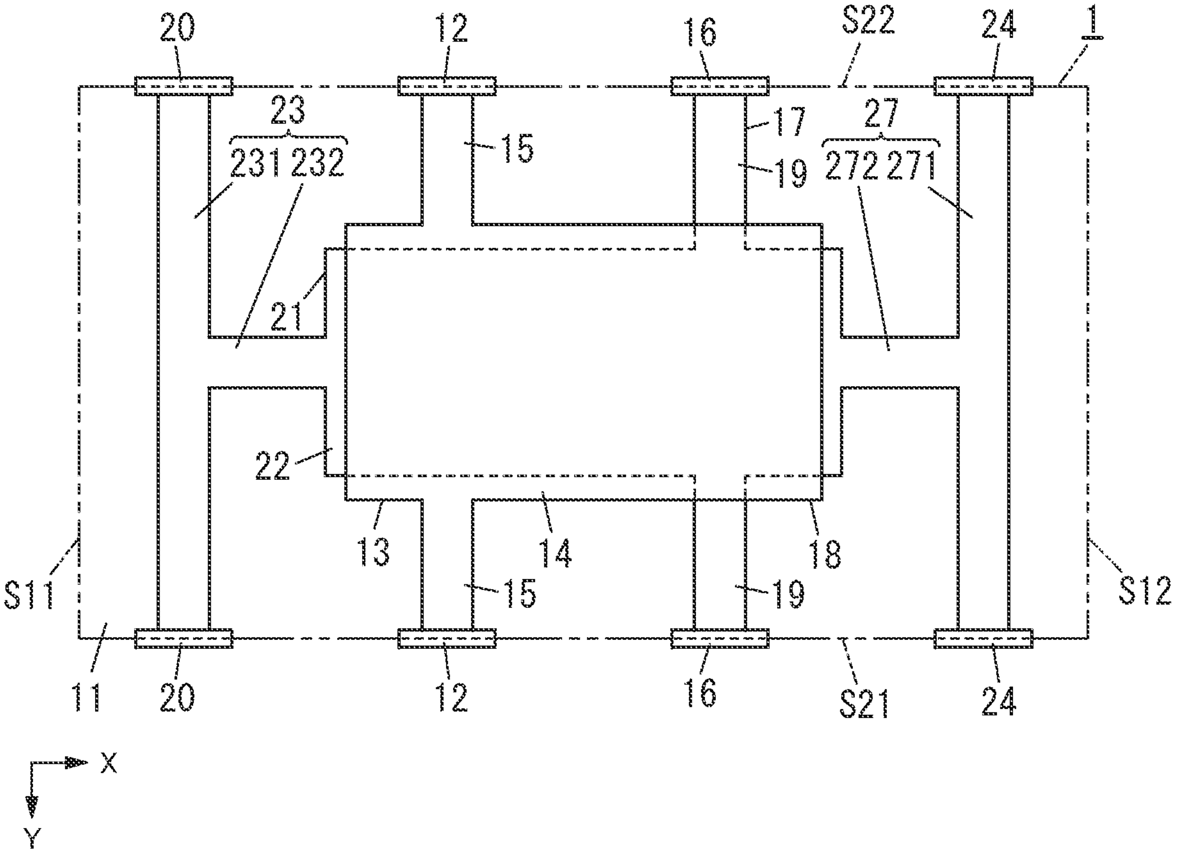
FIG. 14 is a see-through top view of a multilayer varistor according to a modified example of the fourth variation.

FIG. 14 is a see-through top view of a multilayer varistor 1 according to a modified example of the fourth variation. In the multilayer varistor 1 shown in FIG. 14, when measured in the second direction, the length of the third facing portion 22 is less than any one of the length of the first facing portion 14 or the length of the second facing portion 18. On the other hand, when measured in the first direction, the length of the third facing portion 22 is greater than any one of the length of the first facing portion 14 or the length of the second facing portion 18. This allows this multilayer varistor 1 to reduce the chances of causing crosstalk and also reduce the difference in capacitance between the first varistor 1A and the second varistor 1B due to a manufacturing error, compared to a situation where the third facing portion 22 is shorter in both of the first and second directions than any one of the first facing portion 14 or the second facing portion 18.

(Fifth Variation)

Figure 15:
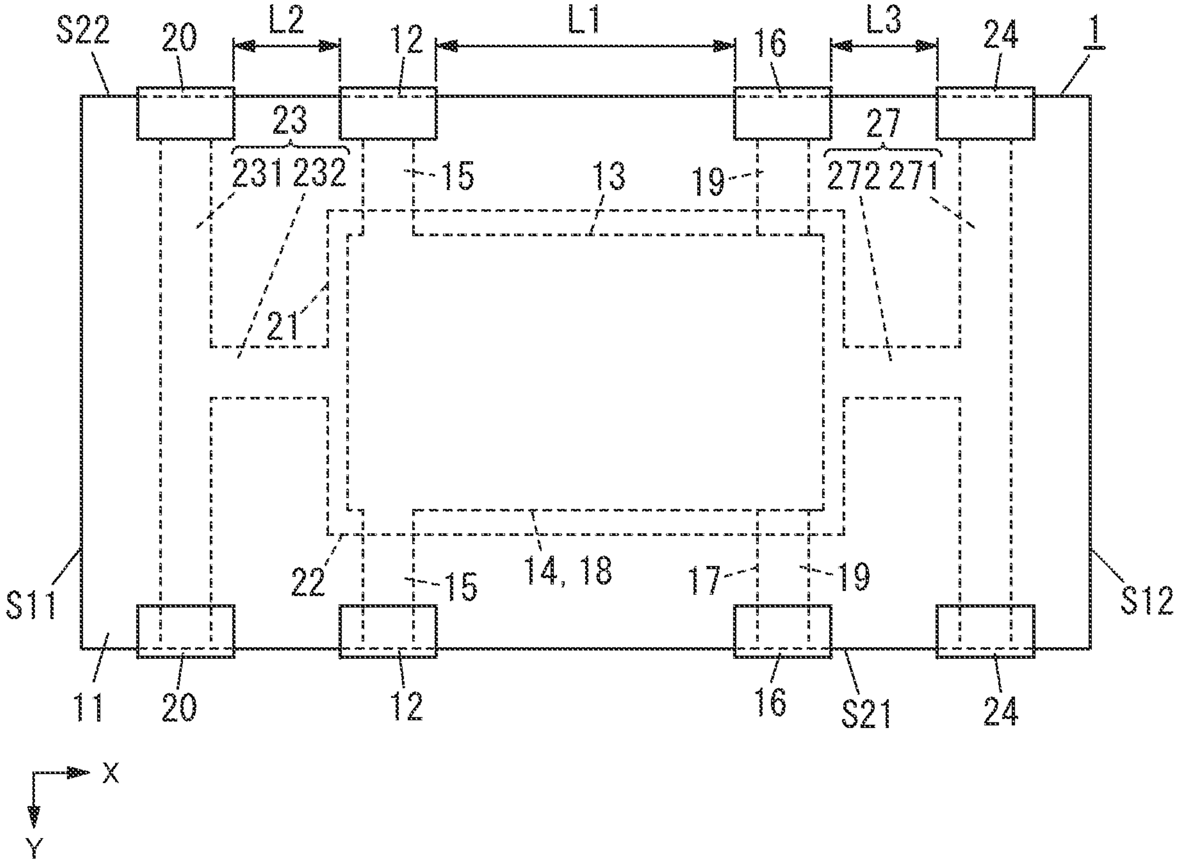
FIG. 15 is a plan view of a multilayer varistor according to a fifth variation.

FIG. 15 is a plan view of a multilayer varistor 1 according to a fifth variation of the first embodiment. In the multilayer varistor 1 according to the fifth variation, a first distance L1 between the first external electrode 12 and the second external electrode 16 is longer than any one of a second distance L2 between the first external electrode 12 and the third external electrode 20 or a third distance L3 between the second external electrode 16 and the fourth external electrode 24. Except the arrangement of the first to fourth external electrodes 12, 16, 20, 24, the fifth variation has the same configuration as the first embodiment. Thus, any constituent element of this fifth variation, having the same function as a counterpart of the first embodiment described above, will be designated by the same reference numeral as that counterpart's, and description thereof will be omitted herein.

Arranging the first to fourth external electrodes 12, 16, 20, 24 on each of the first side surface S21 and the second side surface S22 to make the first distance L1 longer than any one of the second distance L2 or the third distance L3 makes the first distance L1 longer than in a situation where the first to fourth external electrodes 12, 16, 20, 24 are arranged at regular intervals. This reduces the stray capacitance produced between the first external electrode 12 and the second external electrode 16, thus reducing the chances of causing crosstalk.

Note that the first distance L1 between the first external electrode 12 and the second external electrode 16 only needs to be longer than at least one of the second distance L2 between the first external electrode 12 and the third external electrode 20 or the third distance L3 between the second external electrode 16 and the fourth external electrode 24 to reduce the chances of causing crosstalk.

(Sixth Variation)

Figure 16:
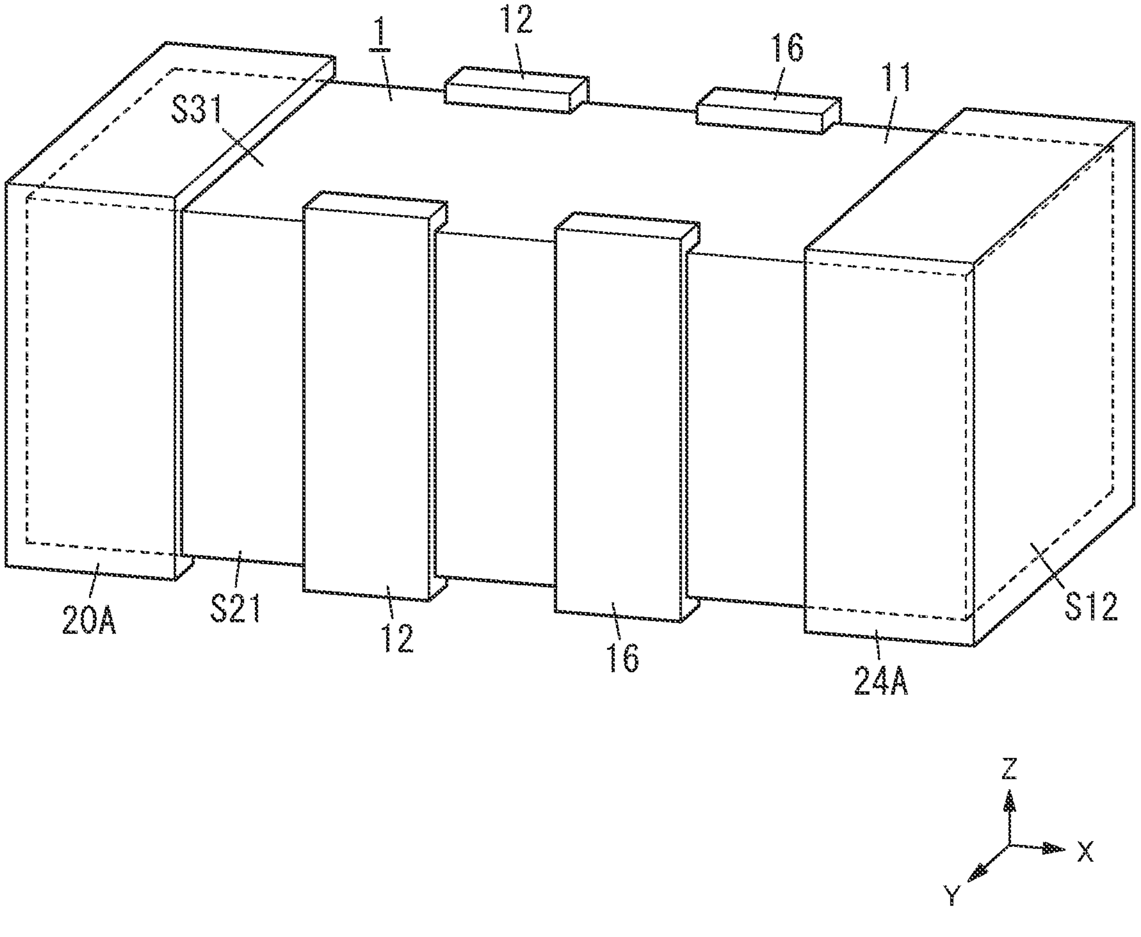
FIG. 16 is a perspective view illustrating the appearance of a multilayer varistor according to a sixth variation.

FIG. 16 is a perspective view illustrating the appearance of a multilayer varistor 1 according to a sixth variation of the first embodiment. In the multilayer varistor 1 according to the sixth variation, the third external electrode 20A and the fourth external electrode 24A are formed by dipping the first end surface S11 and second end surface S12 of the sintered body 11 in a conductive paste. Thus, the third external electrode 20A is formed to be extended from the first end surface S11 to cover respective left end portions of the first side surface S21, the second side surface S22, the first principal surface S31, and the second principal surface S32. Likewise, the fourth external electrode 24A is formed to be extended from the second end surface S12 to cover respective right end portions of the first side surface S21, the second side surface S22, the first principal surface S31, and the second principal surface S32.

In this case, the first linking portion 231 of the third extended portion 23 may be omitted. That is to say, the third extended portion 23 of the third internal electrode 21 may consist of only the first protruding portion 232 protruding to the left in the first direction from the third facing portion 22 to be connected to the third external electrode 20A. The third facing portion 22 of the third internal electrode 21 and the third external electrode 20A may be connected to each other via the first protruding portion 232.

Likewise, the second linking portion 271 of the fourth extended portion 27 may be omitted. That is to say, the fourth extended portion 27 of the third internal electrode 21 may consist of only the second protruding portion 272 protruding to the right in the first direction from the third facing portion 22 to be connected to the fourth external electrode 24A. The third facing portion 22 of the third internal electrode 21 and the fourth external electrode 24A may be connected to each other via the second protruding portion 272.

Except the third external electrode 20A, the fourth external electrode 24A, and the third internal electrode 21, this sixth variation has the same configuration as the exemplary embodiment described above. Thus, any constituent element of this sixth variation, having the same function as a counterpart of the first embodiment described above, will be designated by the same reference numeral as that counterpart's, and description thereof will be omitted herein.

Second Embodiment

Figure 17:
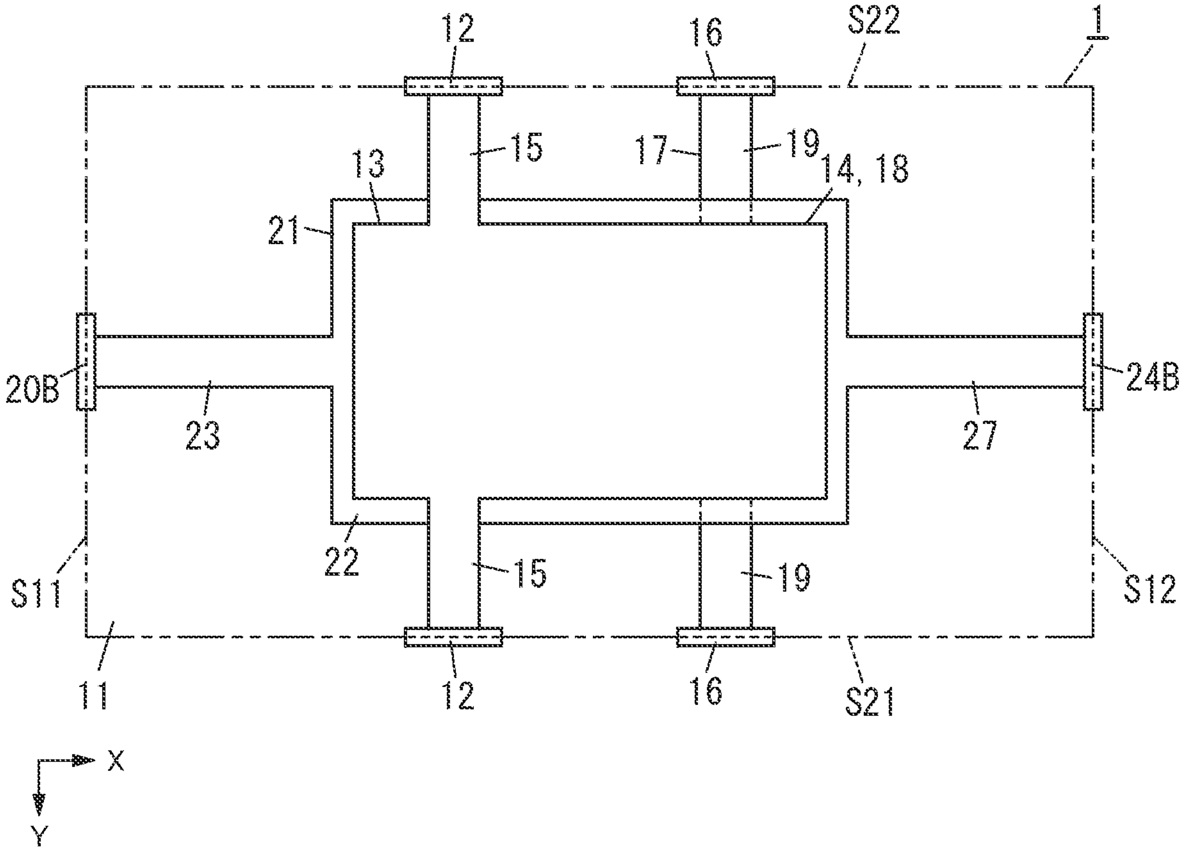
FIG. 17 is a see-through top view of a multilayer varistor according to a second embodiment of the present disclosure.
Figure 18:
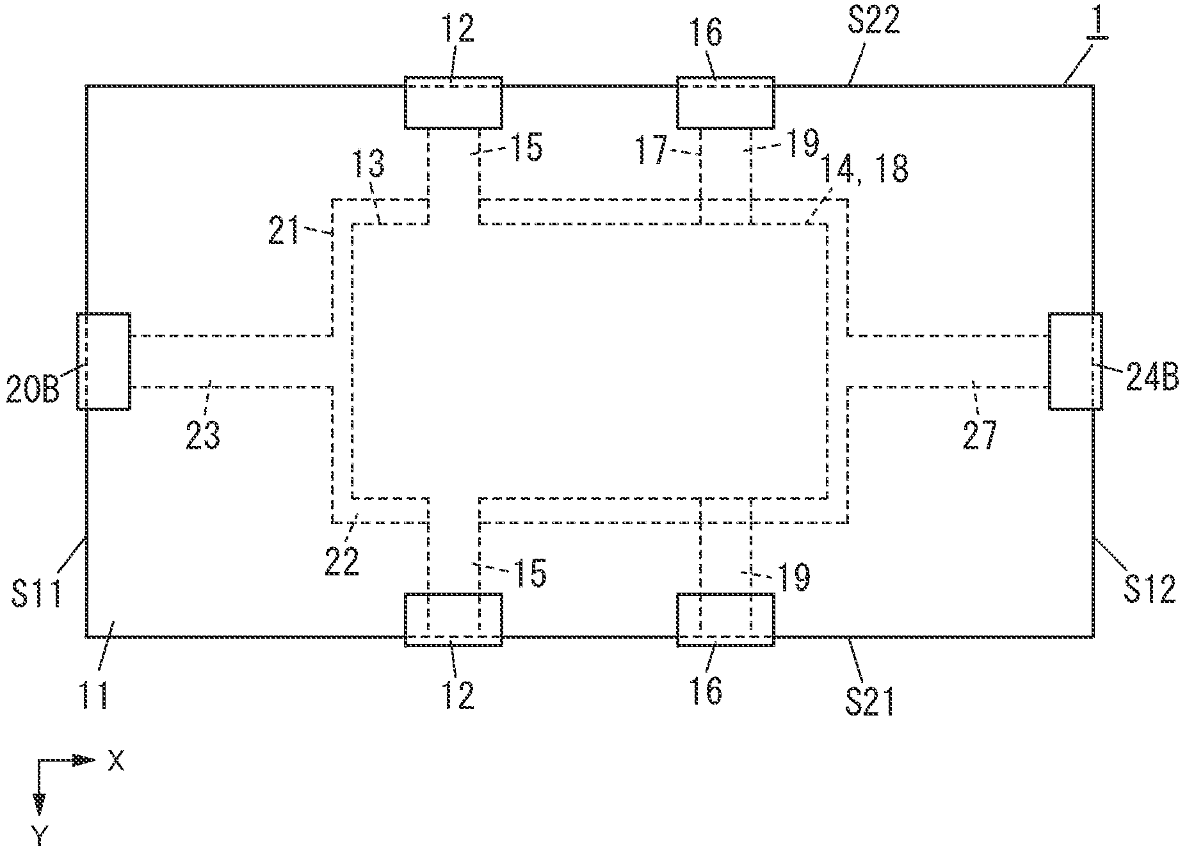
FIG. 18 is a plan view of the multilayer varistor.

FIG. 17 is a see-through top view of a multilayer varistor 1 according to a second embodiment. FIG. 18 is a plan view of the multilayer varistor 1. In the multilayer varistor 1 according to the second embodiment, a third external electrode 20B is provided for the first end surface S11 and electrically connected to the third internal electrode 21. In addition, a fourth external electrode 24B is provided for the second end surface S12 and electrically connected to the third internal electrode 21. Except the third external electrode 20B and the fourth external electrode 24B, the second embodiment has the same configuration as the first embodiment. Thus, any constituent element of this second embodiment, having the same function as a counterpart of the first embodiment described above, will be designated by the same reference numeral as that counterpart's, and description thereof will be omitted herein.

The third external electrode 20B is formed by transferring, using a roller, for example, a conductive paste onto a middle portion of the first end surface S11 in the second direction.

The fourth external electrode 24B is formed by transferring, using a roller, for example, a conductive paste onto a middle portion of the second end surface S12 in the second direction.

The third internal electrode 21 includes the third facing portion 22, the third extended portion 23, and the fourth extended portion 27. The third extended portion 23 protrudes to the left, for example, in the first direction from the third facing portion 22 to be connected to the third external electrode 20B. The fourth extended portion 27 protrudes to the right, for example, in the first direction from the third facing portion 22 to be connected to the fourth external electrode 24B. That is to say, the third external electrode 20B is connected to the third facing portion 22 via the third extended portion 23 and the fourth external electrode 24B is connected to the third facing portion 22 via the fourth extended portion 27. The third external electrode 20B and the fourth external electrode 24B are connected to each other via the third internal electrode 21.

In the multilayer varistor 1 according to this embodiment, the first external electrodes 12 and the second external electrodes 16 are interposed in the first direction between the third external electrode 20B and the fourth external electrode 24B. More specifically, the third external electrode 20B, the first external electrodes 12, the second external electrodes 16, and the fourth external electrode 24B are arranged side by side in this order in the first direction.

Note that the first external electrode 12 and second external electrode 16 provided on the first side surface S21 are extended from the first side surface S21 to partially cover the first principal surface S31 and the second principal surface S32. Likewise, the first external electrode 12 and second external electrode 16 provided on the second side surface S22 are extended from the second side surface S22 to partially cover the first principal surface S31 and the second principal surface S32. In the same way, the third external electrode 20B provided on the first end surface S11 is extended from the first end surface S11 to partially cover the first principal surface S31 and the second principal surface S32. The fourth external electrode 24B provided on the second end surface S12 is extended from the second end surface S12 to partially cover the first principal surface S31 and the second principal surface S32.

In this embodiment, the first facing portion 14 is arranged to avoid overlapping in the third direction with the second external electrodes 16 as shown in FIG. 18, thus reducing the chances of causing crosstalk between the first external electrodes 12 and the second external electrodes 16. Note that as far as the first facing portion 14 does not overlap in the third direction with the second external electrodes 16, the size of the first facing portion 14 as viewed in the third direction (i.e., in top view) is preferably increased as much as possible. This increases the amount of current that can flow through the multilayer varistor 1 (i.e., the first varistor 1A).

In addition, the second facing portion 18 is arranged to avoid overlapping in the third direction with the first external electrodes 12 as shown in FIG. 18, thus reducing the chances of causing crosstalk between the first external electrodes 12 and the second external electrodes 16. Note that as far as the second facing portion 18 does not overlap in the third direction with the first external electrodes 12, the size of the second facing portion 18 as viewed in the third direction (i.e., in top view) is preferably increased as much as possible. This increases the amount of current that can flow through the multilayer varistor 1 (i.e., the second varistor 1B).

In this embodiment, the first to fourth external electrodes 12, 16, 20B, 24B are also preferably arranged to make a first distance between the first external electrodes 12 and the second external electrodes 16 longer than at least one of a second distance between the first external electrodes 12 and the third external electrode 20B or a third distance between the second external electrodes 16 and the fourth external electrode 24B. In this case, the second distance between the first external electrodes 12 and the third external electrode 20B is the shortest distance between the first external electrodes 12 and the third external electrode 20B on either the first principal surface S31 or the second principal surface S32. Likewise, the third distance between the second external electrodes 16 and the fourth external electrode 24B is the shortest distance between the second external electrodes 16 and the fourth external electrode 24B on either the first principal surface S31 or the second principal surface S32. Arranging the first to fourth external electrodes 12, 16, 20B, 24B to make the first distance longer than at least one of the second distance or the third distance reduces the chances of causing crosstalk between the first external electrodes 12 and the second external electrodes 16.

Note that the first external electrode 12 only needs to be provided for at least one of the first side surface S21 or the second side surface S22. The second external electrode 16 only needs to be provided for at least one of the first side surface S21 or the second side surface S22.

Figure 19:
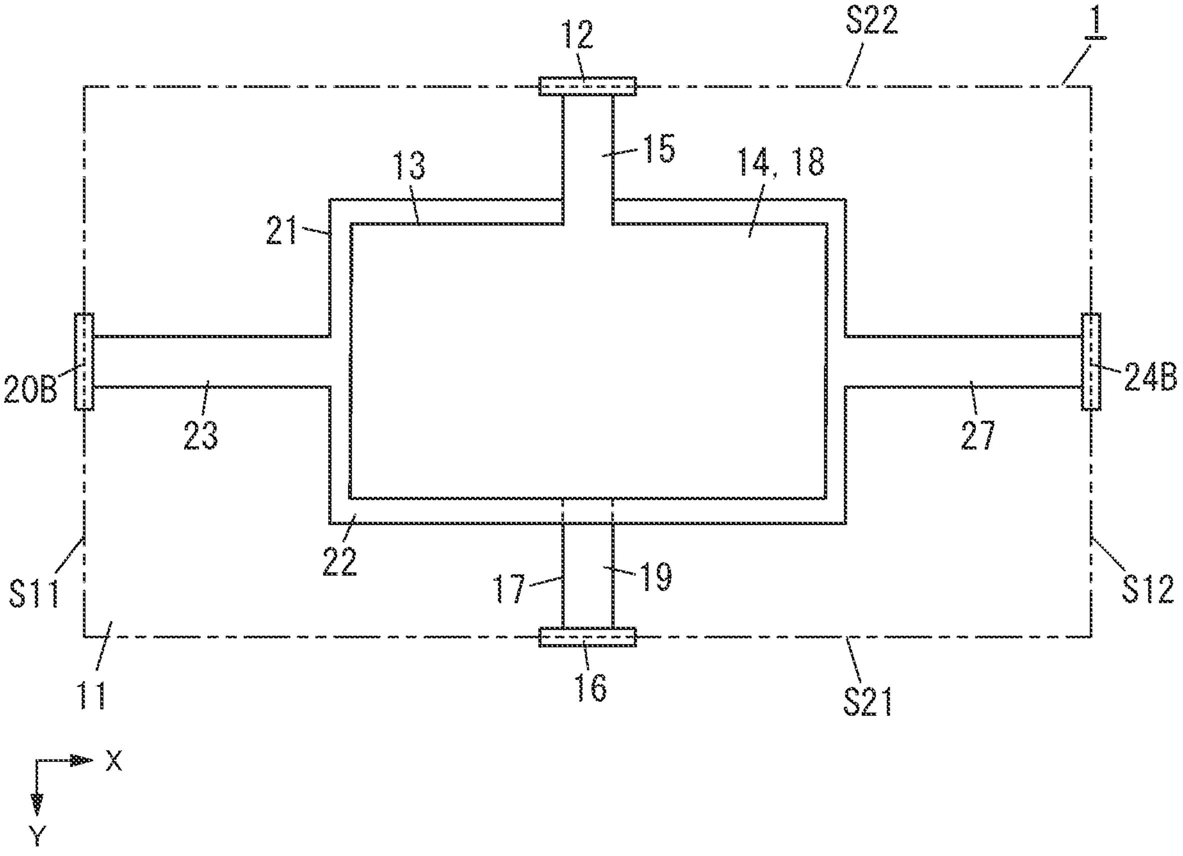
FIG. 19 is a see-through top view of a multilayer varistor according to a modified example of the second embodiment.

Alternatively, the first external electrode 12 may be provided, for example, at the middle of the second side surface S22 in the first direction and the second external electrode 16 may be provided, for example, at the middle of the first side surface S21 in the first direction as shown in FIG. 19. The first internal electrode 13 includes the first facing portion 14 and the first extended portion 15 protruding backward, for example, in the second direction from the first facing portion 14. The first extended portion 15 is connected to the first external electrode 12. The second internal electrode 17 includes the second facing portion 18 and the second extended portion 19 protruding forward, for example, in the second direction from the second facing portion 18. The second extended portion 19 is connected to the second external electrode 16.

In this multilayer varistor 1, the first external electrode 12 and the second external electrode 16 are arranged at the middle in the first direction, thus extending the interval from the first external electrode 12 and the second external electrode 16 to the third external electrode 20B and the interval from the first external electrode 12 and the second external electrode 16 to the fourth external electrode 24B. This reduces the capacitance produced between the first external electrode 12, the second external electrode 16, and the third external electrode 20B and between the first external electrode 12, the second external electrode 16, and the fourth external electrode 24B, thus enabling reducing crosstalk.

Figure 20:
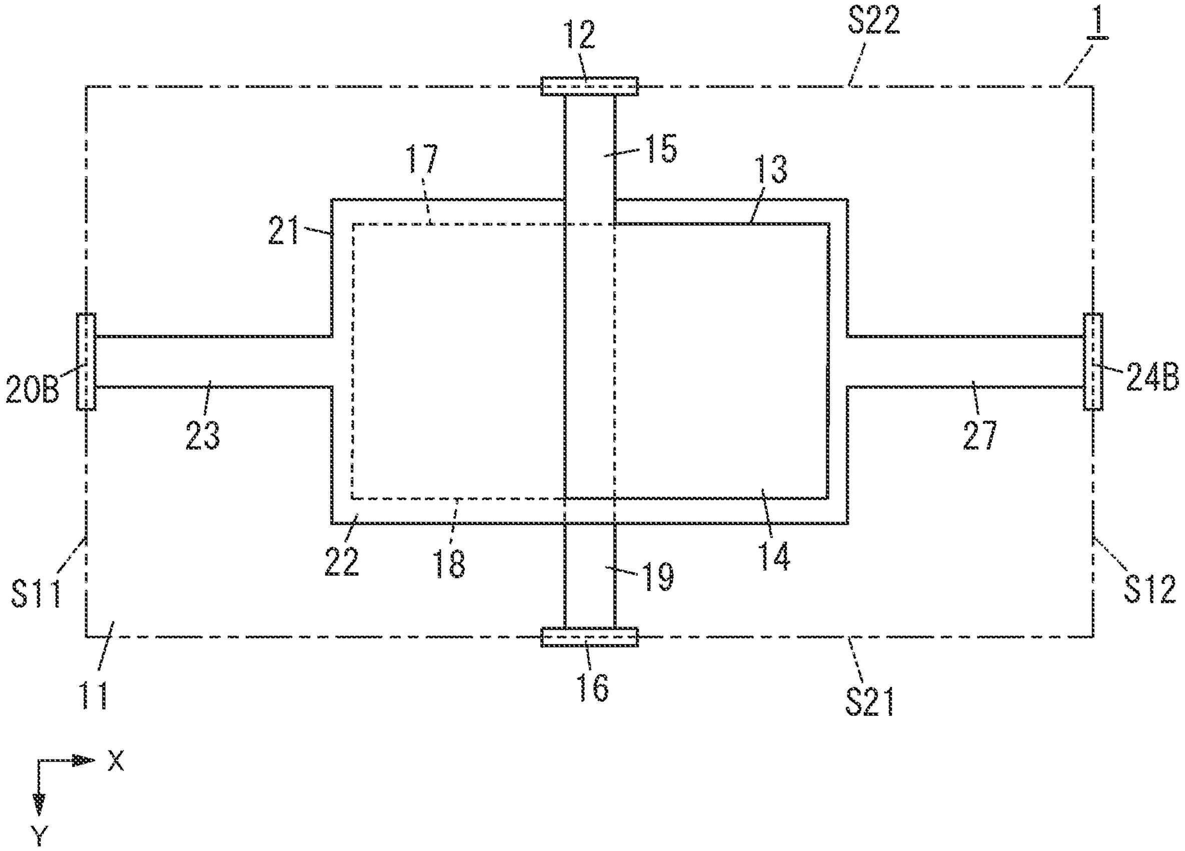
FIG. 20 is a see-through top view of a multilayer varistor according to another modified example of the second embodiment.

Alternatively, as shown in FIG. 20, the first facing portion 14 may be arranged to overlap in the third direction with about a right half of the third facing portion 22 and the second facing portion 18 may be arranged to overlap in the third direction with about a left half of the third facing portion 22. This reduces the overlapping area between the first facing portion 14 and the second facing portion 18 as viewed in the third direction and thereby reduces the capacitance produced between the first external electrode 12 and the second external electrode 16, thus eventually reducing the chances of causing crosstalk.

(Recapitulation)

A multilayer varistor (1) according to a first aspect includes a sintered body (11), a first internal electrode (13), a second internal electrode (17), a third internal electrode (21), a first external electrode (12), a second external electrode (16), a third external electrode (20, 20A), and a fourth external electrode (24, 24A). The sintered body (11) has a first end surface (S11) and a second end surface (S12) facing each other in a first direction, a first side surface (S21) and a second side surface (S22) facing each other in a second direction, and a first principal surface (S31) and a second principal surface (S32) facing each other in a third direction. The sintered body (11) is formed in a shape of a rectangular parallelepiped, of which a longitudinal axis is aligned with the first direction. The sintered body (11) has a multilayer structure in which a plurality of layers (LY11-LY14) are stacked one on top of another in the third direction. The first internal electrode (13) is provided on a first stacking plane (SF1) inside the sintered body (11). The second internal electrode (17) is provided on a second stacking plane (SF2) inside the sintered body (11). The second stacking plane (SF2) is different from the first stacking plane (SF1). The third internal electrode (21) is provided on a third stacking plane (SF3) inside the sintered body (11). The third stacking plane (SF3) is interposed between the first stacking plane (SF1) and the second stacking plane (SF2). The first external electrode (12) is provided for at least one of the first side surface (S21) or the second side surface (S22) and electrically connected to the first internal electrode (13). The second external electrode (16) is provided for at least one of the first side surface (S21) or the second side surface (S22) and electrically connected to the second internal electrode (17). The third external electrode (20, 20A) and the fourth external electrode (24, 24A) are both provided for at least one of the first side surface (S21) or the second side surface (S22) and electrically connected to the third internal electrode (21). The third internal electrode (21) has a first overlapping region (A1) that overlaps in the third direction with at least a part of the first internal electrode (13) and a second overlapping region (A2) that overlaps in the third direction with at least a part of the second internal electrode (17). The first external electrode (12) and the second external electrode (16) are interposed in the first direction between the third external electrode (20, 20A) and the fourth external electrode (24, 24A).

This aspect may provide a multilayer varistor (1) that reduces the chances of causing crosstalk. In addition, this aspect enables connecting the multilayer varistor (1) to a balanced line without bending its paths.

In a multilayer varistor (1) according to a second aspect, which may be implemented in conjunction with the first aspect, the first external electrode (12) includes a first electrode (51) provided on the first side surface (S21) and a second electrode (52) provided on the second side surface (S22). The first electrode (51) and the second electrode (52) are electrically connected to each other via the first internal electrode (13). The second external electrode (16) includes a third electrode (53) provided on the first side surface (S21) and a fourth electrode (54) provided on the second side surface (S22). The third electrode (53) and the fourth electrode (54) are electrically connected to each other via the second internal electrode (17). The third external electrode (20, 20A) includes a fifth electrode (55) provided on the first side surface (S21) and a sixth electrode (56) provided on the second side surface (S22). The fifth electrode (55) and the sixth electrode (56) are electrically connected to each other via the third internal electrode (21). The fourth external electrode (24, 24A) includes a seventh electrode (57) provided on the first side surface (S21) and an eighth electrode (58) provided on the second side surface (S22). The seventh electrode (57) and the eighth electrode (58) are electrically connected to each other via the third internal electrode (21).

This aspect allows the multilayer varistor (1) to be mounted onto a board more firmly by connecting the first to eighth electrodes (51-58) to the board.

In a multilayer varistor (1) according to a third aspect, which may be implemented in conjunction with the second aspect, the third internal electrode (21) includes a third facing portion (22), a third extended portion (23), and a fourth extended portion (27). The third extended portion (23) includes a first linking portion (231) and a first protruding portion (232). The first linking portion (231) links the fifth electrode (55) and the sixth electrode (56) together. The first protruding portion (232) has a narrower width than the third facing portion (22) and protrudes in the first direction from the third facing portion (22) to be connected to the first linking portion (231). The fourth extended portion (27) includes a second linking portion (271) and a second protruding portion (272). The second linking portion (271) links the seventh electrode (57) and the eighth electrode (58) together. The second protruding portion (272) has a narrower width than the third facing portion (22) and protrudes in the first direction from the third facing portion (22) to be connected to the second linking portion (271).

This aspect may reduce stray capacitance between the first external electrode (12) and the second external electrode (16), thus reducing the chances of causing crosstalk.

A multilayer varistor (1) according to a fourth aspect includes a sintered body (11), a first internal electrode (13), a second internal electrode (17), a third internal electrode (21), a first external electrode (12), a second external electrode (16), a third external electrode (20B), and a fourth external electrode (24B). The sintered body (11) has a first end surface (S11) and a second end surface (S12) facing each other in a first direction, a first side surface (S21) and a second side surface (S22) facing each other in a second direction, and a first principal surface (S31) and a second principal surface (S32) facing each other in a third direction. The sintered body (11) is formed in a shape of a rectangular parallelepiped, of which a longitudinal axis is aligned with the first direction. The sintered body (11) has a multilayer structure in which a plurality of layers (LY11-LY14) are stacked one on top of another in the third direction. The first internal electrode (13) is provided on a first stacking plane (SF1) inside the sintered body (11). The second internal electrode (17) is provided on a second stacking plane (SF2) inside the sintered body (11). The second stacking plane (SF2) is different from the first stacking plane (SF1). The third internal electrode (21) is provided on a third stacking plane (SF3) inside the sintered body (11). The third stacking plane (SF3) is interposed between the first stacking plane (SF1) and the second stacking plane (SF2). The first external electrode (12) is provided for at least one of the first side surface (S21) or the second side surface (S22) and electrically connected to the first internal electrode (13). The second external electrode (16) is provided for at least one of the first side surface (S21) or the second side surface (S22) and electrically connected to the second internal electrode (17). The third external electrode (20B) is provided for the first end surface (S11) and electrically connected to the third internal electrode (21). The fourth external electrode (24B) is provided for the second end surface (S12) and electrically connected to the third internal electrode (21). The third internal electrode (21) has a first overlapping region (A1) that overlaps in the third direction with at least a part of the first internal electrode (13) and a second overlapping region (A2) that overlaps in the third direction with at least a part of the second internal electrode (17). The first external electrode (12) and the second external electrode (16) are interposed in the first direction between the third external electrode (20B) and the fourth external electrode (24B).

This aspect may provide a multilayer varistor (1) that reduces the chances of causing crosstalk. In addition, this aspect enables connecting the multilayer varistor (1) to a balanced line without bending its paths.

In a multilayer varistor (1) according to a fifth aspect, which may be implemented in conjunction with any one of the first to fourth aspects, in the third internal electrode (21), the first overlapping region (A1) and the second overlapping region (A2) overlap with each other at least partially.

This aspect may provide a multilayer varistor (1) that reduces the chances of causing crosstalk.

In a multilayer varistor (1) according to a sixth aspect, which may be implemented in conjunction with any one of the first to fourth aspects, in the third internal electrode (21), the first overlapping region (A1) and the second overlapping region (A2) are separate from each other.

This aspect may further reduce the chances of causing crosstalk between the first external electrode (12) and the second external electrode (16).

In a multilayer varistor (1) according to a seventh aspect, which may be implemented in conjunction with any one of the first to sixth aspects, in the first direction, the third external electrode (20, 20A, 20B), the first external electrode (12), the second external electrode (16), and the fourth external electrode (24, 24A, 24B) are arranged side by side in this order. A first distance (L1) is longer than at least one of a second distance (L2) or a third distance (L3). The first distance (L1) is a distance between the first external electrode (12) and the second external electrode (16). The second distance (L2) is a distance between the third external electrode (20, 20A, 20B) and the first external electrode (12). The third distance (L3) is a distance between the second external electrode (16) and the fourth external electrode (24, 24A, 24B).

This aspect may further reduce the chances of causing crosstalk between the first external electrode (12) and the second external electrode (16).

In a multilayer varistor (1) according to an eighth aspect, which may be implemented in conjunction with any one of the first to seventh aspects, the first internal electrode (13) includes a first facing portion (14) and a first extended portion (15) having a narrower width than the first facing portion (14).

This aspect may further reduce the chances of causing crosstalk between the first external electrode (12) and the second external electrode (16).

In a multilayer varistor (1) according to a ninth aspect, which may be implemented in conjunction with the eighth aspect, when measured in the first direction, the width of the first extended portion (15) is equal to or less than 90% of the width of the first facing portion (14).

This aspect may further reduce the chances of causing crosstalk between the first external electrode (12) and the second external electrode (16).

In a multilayer varistor (1) according to a tenth aspect, which may be implemented in conjunction with the eighth or ninth aspect, the second internal electrode (17) includes a second facing portion (18) and a second extended portion (19) having a narrower width than the second facing portion (18).

This aspect may further reduce the chances of causing crosstalk between the first external electrode (12) and the second external electrode (16).

In a multilayer varistor (1) according to an eleventh aspect, which may be implemented in conjunction with the tenth aspect, when measured in the first direction, the width of the second extended portion (19) is equal to or less than 90% of the width of the second facing portion (18).

This aspect may further reduce the chances of causing crosstalk between the first external electrode (12) and the second external electrode (16).

In a multilayer varistor (1) according to a twelfth aspect, which may be implemented in conjunction with the tenth or eleventh aspect, the third internal electrode (21) includes a third facing portion (22), a third extended portion (23), and a fourth extended portion (27). The third extended portion (23) is connected to the third external electrode (20, 20A, 20B) and has a narrower width than the third facing portion (22). The fourth extended portion (27) is connected to the fourth external electrode (24, 24A, 24B) and has a narrower width than the third facing portion (22).

This aspect may further reduce the chances of causing crosstalk between the first external electrode (12) and the second external electrode (16).

In a multilayer varistor (1) according to a thirteenth aspect, which may be implemented in conjunction with the twelfth aspect, when measured in the first direction, the length of the third facing portion (22) is greater than any one of the length of the first facing portion (14) or the length of the second facing portion (18).

This aspect makes it easier, even if the third facing portion (22) has relatively shifted to a certain degree in the first direction with respect to the first facing portion (14) and the second facing portion (18), for the third facing portion (22) to face the first facing portion (14) and the second facing portion (18) in their entirety, thus reducing a variation in capacitance.

In a multilayer varistor (1) according to a fourteenth aspect, which may be implemented in conjunction with the twelfth or thirteenth aspect, when measured in the first direction, the length of the third facing portion (22) is equal to or greater than 107.5% and equal to or less than 115% of respective lengths of the first facing portion (14) and the second facing portion (18).

This aspect may reduce a variation in capacitance due to a manufacturing error while reducing the chances of causing crosstalk.

In a multilayer varistor (1) according to a fifteenth aspect, which may be implemented in conjunction with any one of the twelfth to fourteenth aspects, when measured in the second direction, the length of the third facing portion (22) is greater than any one of the length of the first facing portion (14) or the length of the second facing portion (18).

This aspect makes it easier, even if the third facing portion (22) has relatively shifted to a certain degree in the second direction with respect to the first facing portion (14) and the second facing portion (18), for the third facing portion (22) to face the first facing portion (14) and the second facing portion (18) in their entirety, thus reducing a variation in capacitance.

In a multilayer varistor (1) according to a sixteenth aspect, which may be implemented in conjunction with any one of the twelfth to fifteenth aspects, when measured in the second direction, the length of the third facing portion (22) is equal to or greater than 107.5% and equal to or less than 115% of respective lengths of the first facing portion (14) and the second facing portion (18).

This aspect may reduce a variation in capacitance due to a manufacturing error while reducing the chances of causing crosstalk.

In a multilayer varistor (1) according to a seventeenth aspect, which may be implemented in conjunction with any one of the twelfth to sixteenth aspects, the area of the third facing portion (22) is larger than any one of the area of the first facing portion (14) or the area of the second facing portion (18).

This aspect makes it easier, even if the third facing portion (22) has relatively shifted to a certain degree in either the first direction or the second direction with respect to the first facing portion (14) and the second facing portion (18), for the third facing portion (22) to face the first facing portion (14) and the second facing portion (18) in their entirety, thus reducing a variation in capacitance.

In a multilayer varistor (1) according to an eighteenth aspect, which may be implemented in conjunction with any one of the twelfth to seventeenth aspects, the third extended portion (23) includes a first protruding portion (232) protruding in the first direction from the third facing portion (22). The fourth extended portion (27) includes a second protruding portion (272) protruding in the first direction from the third facing portion (22). When measured in the second direction, the width of the first protruding portion (232) is equal to or less than 90% of the width of the third facing portion (22). When measured in the second direction, the width of the second protruding portion (272) is equal to or less than 90% of the width of the third facing portion (22).

This aspect may reduce the chances of causing crosstalk.

In a multilayer varistor (1) according to a nineteenth aspect, which may be implemented in conjunction with any one of the eighth to eighteenth aspects, the first facing portion (14) is arranged to avoid overlapping in the third direction with the second external electrode (16).

This aspect may reduce the chances of causing crosstalk.

In a multilayer varistor (1) according to a twentieth aspect, which may be implemented in conjunction with any one of the tenth to eighteenth aspects, the second facing portion (18) is arranged to avoid overlapping in the third direction with the first external electrode (12).

This aspect may reduce the chances of causing crosstalk.

A multilayer varistor (1) according to a twenty-first aspect, which may be implemented in conjunction with any one of the first to twentieth aspects, includes a first varistor (1A) and a second varistor (1B). The first varistor (1A) is formed between the first external electrode (12) and the third external electrode (20, 20A, 20B). The second varistor (1B) is formed between the second external electrode (16) and the fourth external electrode (24, 24A, 24B). Each of the first varistor (1A) and the second varistor (1B) has a capacitance equal to or less than 200 pF. The difference between the capacitance of the first varistor (1A) and the capacitance of the second varistor (1B) is equal to or greater than ~20% and equal to or less than +20% of the capacitance of the first varistor (1A).

This aspect may reduce the chances of causing crosstalk. In addition, this aspect also improves, when this multilayer varistor (1) is used in a communications circuit, the quality of communication.

The present disclosure provides a multilayer varistor with the ability to reduce crosstalk by decreasing stray capacitance produced between external electrodes. Thus, the multilayer varistor according to the present invention is broadly applicable on an industrial basis.

REFERENCE SIGNS LIST

1 Multilayer Varistor
1A First Varistor
1B Second Varistor
11 Sintered Body
12 First External Electrode
13 First Internal Electrode
14 First Facing Portion
15 First Extended Portion
16 Second External Electrode
17 Second Internal Electrode
18 Second Facing Portion
19 Second Extended Portion
20, 20A, 20B Third External Electrode
21 Third Internal Electrode
22 Third Facing Portion
23 Third Extended Portion
24, 24A, 24B Fourth External Electrode
51 First Electrode
52 Second Electrode
53 Third Electrode
54 Fourth Electrode
55 Fifth Electrode
56 Sixth Electrode
57 Seventh Electrode
58 Eighth Electrode
231 First Linking Portion
232 First Protruding Portion
271 Second Linking Portion
272 Second Protruding Portion
A1 First Overlapping Region
A2 Second Overlapping Region
L1 First Distance
L2 Second Distance
L3 Third Distance
LY11-LY14 Layer
S11 First End Surface
S12 Second End Surface
S21 First Side Surface
S22 Second Side Surface
S31 First Principal Surface
S32 Second Principal Surface
SF1 First Stacking Plane
SF2 Second Stacking Plane
SF3 Third Stacking Plane

The invention claimed is:

1. A multilayer varistor comprising:

a sintered body having a first end surface and a second end surface facing each other in a first direction, a first side surface and a second side surface facing each other in a second direction, and a first principal surface and a second principal surface facing each other in a third direction, the sintered body being formed in a shape of a rectangular parallelepiped, a longitudinal axis of the rectangular parallelepiped being aligned with the first direction, the sintered body having a multilayer structure in which a plurality of layers are stacked one on top of another in the third direction;

a first internal electrode provided on a first stacking plane inside the sintered body;

a second internal electrode provided on a second stacking plane inside the sintered body, the second stacking plane being different from the first stacking plane;

a third internal electrode provided on a third stacking plane inside the sintered body, the third stacking plane being interposed between the first stacking plane and the second stacking plane;

a first external electrode provided for at least one of the first side surface or the second side surface and electrically connected to the first internal electrode;

a second external electrode provided for at least one of the first side surface or the second side surface and electrically connected to the second internal electrode; and a third external electrode and a fourth external electrode both provided for at least one of the first side surface or the second side surface and electrically connected to the third internal electrode, the third internal electrode having a first overlapping region that overlaps in the third direction with at least a part of the first internal electrode and a second overlapping region that overlaps in the third direction with at least a part of the second internal electrode, the first external electrode and the second external electrode being interposed in the first direction between the third external electrode and the fourth external electrode, the first external electrode including a first electrode provided on the first side surface and a second electrode provided on the second side surface, the first electrode and the second electrode being electrically connected to each other via the first internal electrode, the second external electrode including a third electrode provided on the first side surface and a fourth electrode provided on the second side surface, the third electrode and the fourth electrode being electrically connected to each other via the second internal electrode, the third external electrode including a fifth electrode provided on the first side surface and a sixth electrode provided on the second side surface, the fifth electrode and the sixth electrode being electrically connected to each other via the third internal electrode, and the fourth external electrode including a seventh electrode provided on the first side surface and an eighth electrode provided on the second side surface, the seventh electrode and the eighth electrode being electrically connected to each other via the third internal electrode.

2. The multilayer varistor of claim 1, wherein the third internal electrode includes a third facing portion, a third extended portion, and a fourth extended portion, the third extended portion includes: a first linking portion linking the fifth electrode and the sixth electrode together; and a first protruding portion having a narrower width than the third facing portion and protruding in the first direction from the third facing portion to be connected to the first linking portion, and the fourth extended portion includes: a second linking portion linking the seventh electrode and the eighth electrode together; and a second protruding portion having a narrower width than the third facing portion and protruding in the first direction from the third facing portion to be connected to the second linking portion.

3. The multilayer varistor of claim 1, wherein in the third internal electrode, the first overlapping region and the second overlapping region overlap with each other at least partially.

4. The multilayer varistor of claim 1, wherein in the third internal electrode, the first overlapping region and the second overlapping region are separate from each other.

5. The multilayer varistor of claim 1, wherein the first internal electrode includes a first facing portion and a first extended portion having a narrower width than the first facing portion.

6. The multilayer varistor of claim 5, wherein when measured in the first direction, a width of the first extended portion is equal to or less than 90% of a width of the first facing portion.

7. The multilayer varistor of claim 5, wherein the second internal electrode includes a second facing portion and a second extended portion having a narrower width than the second facing portion.

8. The multilayer varistor of claim 7, wherein when measured in the first direction, a width of the second extended portion is equal to or less than 90% of a width of the second facing portion.

9. The multilayer varistor of claim 7, wherein the third internal electrode includes: a third facing portion; a third extended portion connected to the third external electrode and having a narrower width than the third facing portion; and a fourth extended portion connected to the fourth external electrode and having a narrower width than the third facing portion.

10. The multilayer varistor of claim 9, wherein when measured in the first direction, a length of the third facing portion is greater than any one of length of the first facing portion or length of the second facing portion.

11. The multilayer varistor of claim 9, wherein when measured in the first direction, a length of the third facing portion is equal to or greater than 107.5% and equal to or less than 115% of respective lengths of the first facing portion and the second facing portion.

12. The multilayer varistor of claim 9, wherein when measured in the second direction, a length of the third facing portion is greater than any one of length of the first facing portion or length of the second facing portion.

13. The multilayer varistor of claim 9, wherein when measured in the second direction, a length of the third facing portion is equal to or greater than 107.5% and equal to or less than 115% of respective lengths of the first facing portion and the second facing portion.

14. The multilayer varistor of claim 9, wherein an area of the third facing portion is larger than any one of an area of the first facing portion or an area of the second facing portion.

15. The multilayer varistor of claim 9, wherein the third extended portion includes a first protruding portion protruding in the first direction from the third facing portion, the fourth extended portion includes a second protruding portion protruding in the first direction from the third facing portion, when measured in the second direction, width of the first protruding portion is equal to or less than 90% of width of the third facing portion, and when measured in the second direction, width of the second protruding portion is equal to or less than 90% of width of the third facing portion.

16. The multilayer varistor of claim 7, wherein the second facing portion is arranged to avoid overlapping in the third direction with the first external electrode.

17. The multilayer varistor of claim 5, wherein the first facing portion is arranged to avoid overlapping in the third direction with the second external electrode.

18. The multilayer varistor of claim 1, comprising:

a first varistor formed between the first external electrode and the third external electrode; and a second varistor formed between the second external electrode and the fourth external electrode, each of the first varistor and the second varistor has a capacitance equal to or less than 200 pF, and a difference between the capacitance of the first varistor and the capacitance of the second varistor is equal to or greater −20% and equal to or less than +20% of the capacitance of the first varistor.

19. A multilayer varistor comprising:

a sintered body having a first end surface and a second end surface facing each other in a first direction, a first side surface and a second side surface facing each other in a second direction, and a first principal surface and a second principal surface facing each other in a third direction, the sintered body being formed in a shape of a rectangular parallelepiped, a longitudinal axis of the rectangular parallelepiped being aligned with the first direction, the sintered body having a multilayer structure in which a plurality of layers are stacked one on top of another in the third direction;

a first internal electrode provided on a first stacking plane inside the sintered body;

a second internal electrode provided on a second stacking plane inside the sintered body, the second stacking plane being different from the first stacking plane;

a third internal electrode provided on a third stacking plane inside the sintered body, the third stacking plane being interposed between the first stacking plane and the second stacking plane;

a first external electrode provided for at least one of the first side surface or the second side surface and electrically connected to the first internal electrode;

a second external electrode provided for at least one of the first side surface or the second side surface and electrically connected to the second internal electrode; and a third external electrode provided for the first end surface and electrically connected to the third internal electrode; and a fourth external electrode provided for the second end surface and electrically connected to the third internal electrode, the third internal electrode having a first overlapping region that overlaps in the third direction with at least a part of the first internal electrode and a second overlapping region that overlaps in the third direction with at least a part of the second internal electrode, the first external electrode and the second external electrode being interposed in the first direction between the third external electrode and the fourth external electrode, in the first direction, the third external electrode, the first external electrode, the second external electrode, and the fourth external electrode being arranged side by side in this order, and a first distance between the first external electrode and the second external electrode being longer than at least one of a second distance between the third external electrode and the first external electrode or a third distance between the second external electrode and the fourth external electrode.

20. A multilayer varistor comprising:

a sintered body having a first end surface and a second end surface facing each other in a first direction, a first side surface and a second side surface facing each other in a second direction, and a first principal surface and a second principal surface facing each other in a third direction, the sintered body being formed in a shape of a rectangular parallelepiped, a longitudinal axis of the rectangular parallelepiped being aligned with the first direction, the sintered body having a multilayer structure in which a plurality of layers are stacked one on top of another in the third direction;

a first internal electrode provided on a first stacking plane inside the sintered body;

a second internal electrode provided on a second stacking plane inside the sintered body, the second stacking plane being different from the first stacking plane;

a third internal electrode provided on a third stacking plane inside the sintered body, the third stacking plane being interposed between the first stacking plane and the second stacking plane;

a first external electrode provided for at least one of the first side surface or the second side surface and electrically connected to the first internal electrode;

a second external electrode provided for at least one of the first side surface or the second side surface and electrically connected to the second internal electrode; and a third external electrode and a fourth external electrode both provided for at least one of the first side surface or the second side surface and electrically connected to the third internal electrode, the third internal electrode having a first overlapping region that overlaps in the third direction with at least a part of the first internal electrode and a second overlapping region that overlaps in the third direction with at least a part of the second internal electrode, the first external electrode and the second external electrode being interposed in the first direction between the third external electrode and the fourth external electrode, in the first direction, the third external electrode, the first external electrode, the second external electrode, and the fourth external electrode being arranged side by side in this order, and a first distance between the first external electrode and the second external electrode being longer than at least one of a second distance between the third external electrode and the first external electrode or a third distance between the second external electrode and the fourth external electrode.

* * * * *